United States Patent [19]
Prater

[11] Patent Number: 5,867,169
[45] Date of Patent: Feb. 2, 1999

[54] METHOD AND APPARATUS FOR MANIPULATING COLOR VALUES IN A COMPUTER GRAPHICS SYSTEM

[75] Inventor: Mitch Prater, Petaluma, Calif.

[73] Assignee: Pixar, Richmond, Calif.

[21] Appl. No.: 633,541

[22] Filed: Apr. 17, 1996

[51] Int. Cl.[6] .................................................. G06T 5/00
[52] U.S. Cl. .......................... 345/431; 345/150; 358/520; 382/167
[58] Field of Search ............................. 395/131; 345/150, 345/154, 431; 358/518, 520; 382/167

[56] References Cited

U.S. PATENT DOCUMENTS

| | | | |
|---|---|---|---|
| 4,035,835 | 7/1977 | Poetsch .................................... | 348/228 |
| 5,450,217 | 9/1995 | Eschbach et al. ....................... | 358/518 |
| 5,465,104 | 11/1995 | Munson .................................... | 345/150 |
| 5,467,438 | 11/1995 | Nishio et al. ............................ | 345/431 |

OTHER PUBLICATIONS

Berk et al., "A New Color–Naming System for Graphics Languages", IEEE CG&A, pp. 37–44. May 1982.

Pritchard et al., "Achieving Brightness–insensitive Measurements of Colour Saturation for Use in Object Recognition", Image Processing and Its Applications, Conference Publication No. 410, IEE, pp. 791–795. Jul. 1995.

Matsusashi et al., "Human–face extraction using modified HSV color system and personal identification through facial image based on isodensity maps", CCECE/CCGEI '95, pp. 909–912. 1995.

Lehar et al.,' "High–Speed Manipulation of the Color Chromaticity of Digital Images", IEEE CG&A, pp. 34–39. Feb. 1982.

Foley et al., "Computer Graphics: Principles and Practice", Second Edition, Addison–Wesley Publishing Company, pp. 590–599. 1990.

*Primary Examiner*—Mark K. Zimmerman
*Attorney, Agent, or Firm*—Hecker & Harriman

[57] ABSTRACT

A method for manipulating color values in a computer graphics system. Colors are mapped into a color space referred to as "HSY space," which provides independent control over the orthogonal parameters of hue, saturation and luminance. The intuitive color description qualities of hue and saturation are retained in combination with the luminance parameter, which is specifically tuned to the response of the human eye and a specific display system. The present invention thus provides ease of use for the graphic artist without the hue and saturation dependent luminance response of prior art methods. Color image data in HSY format is manipulated by a color graphics editing or rendering process by altering hue, saturation and luminance individually. The graphic artist is thus able to select the appropriate color by using tints, shades and tones. In one embodiment, HSY color data is converted into a second color data format, such as RGB, for display or storage purposes to meet the physical requirements of display devices. A reverse transformation is used to convert scanned image data in RGB format into HSY data for manipulation in HSY space by the editing process. In addition, two hue preserving transformations are described which map the unit HSY color space into the unit RGB color space.

125 Claims, 15 Drawing Sheets

METHOD AND APPARATUS FOR MANIPULATING COLOR VALUES IN A COMPUTER GRAPHICS SYSTEM

BACKGROUND OF THE INVENTION

1. Field of the Invention

This invention relates to the field of color editing and display systems.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background

Computer graphics and imaging systems often use color displays as output devices or as a means to view work in progress before generating a color print output. In either case, the color display should provide accurate representation of desired colors. Often, color images are "scanned" into a computer graphics system for manipulation or editing. In other cases, color images are generated or rendered in a computer graphics systems for display.

For display purposes, hardware constraints may dictate how colors are represented in the display memory. For instance, a three phosphor display system may store color data as a combination of three phosphor intensity values, such as in a RGB display system. However, for color image editing and manipulation, color representation should be more intuitive to the graphic artist, allowing manipulation of tints, shades and tones. Therefore, in computer graphics and imaging systems, color representation is subject to constraints imposed by the display hardware and by the graphic artist.

RGB color is a commonly used color format for graphic display systems. RGB color is based on a "color model" system. A color model allows convenient specification of colors within a color range, such as the RGB (red, green, blue) primary colors. A color model is a specification of a three-dimensional color coordinate system and a three-dimensional subspace or "color space" in the coordinate system within which each displayable color is represented by a point in space. Typically, computer and graphic display systems are three phosphor systems with a red, green and blue phosphor at each pixel location. The intensities of the red, green and blue phosphors are varied so that the combination of the three primary colors results in a desired output color.

The RGB color model uses a Cartesian coordinate system. The subspace of interest in this coordinate system is known as the "RGB color cube" and is illustrated in FIG. 1. Each corner of the cube represents a color that is theoretically one-hundred percent pure—that is, the color at that location contains only the color specified, and contains no amount of other colors. In the RGB color cube, the corners are defined to be black, white, red, green, blue, magenta, cyan, and yellow. Red, green and blue are the primary colors, black is the absence of color, white is the combination of all colors, and cyan, magenta and yellow are the complements of red, green and blue.

Still referring to FIG. 1, the origin of the coordinate system corresponds to the black corner of the color cube. The cube is a unit cube so that the distance between the origin and adjacent corners is 1. The red corner is thus at location, (1,0,0). The axis between the origin (black) and the red corner is referred to as the red axis 110.

The green corner is at location (0,1,0) and the axis 120 between the black origin and the green corner is referred to as the green axis. The blue corner is at location (0,0,1) and the blue axis 130 is the axis between the blue corner and the origin.

Cyan is at corner (0,1,1), magenta is at corner (1,0,1) and yellow is at corner (1,1,0). The corner opposite the origin on the cube's diagonal at location (1,1,1) is the white corner.

A color is defined in the color cube by a vector having red, green and blue components. For example, vector 180 is the resultant of vectors 180R, (along the red axis), vector 180G (along the green axis) and vector 180B (along the blue axis). The end point of vector 180 can be described mathematically by 0.25 R+0.50 G+0.75 B. The end of this vector defines a point in color space represented mathematically by sum of its red, green and blue components.

An example of a system for displaying RGB color is illustrated in FIG. 2. A refresh buffer 140, also known as a video RAM, or VRAM, is used to store color information for each pixel on a video display, such as CRT display 160. A DRAM can also be used as buffer 140. The VRAM 140 contains one memory location for each pixel location on the display 160. For example, pixel 190 at screen location $X_0 Y_0$ corresponds to memory location 150 in the VRAM 140. The number of bits stored at each memory location for each display pixel varies depending on the amount of color resolution required. For example, for word processing applications or display of text, two intensity values are acceptable so that only a single bit need be stored at each memory location (since the screen pixel is either "on" or "off"). For color images, however, a plurality of intensities must be definable. For certain high end color graphics applications, it has been found that 24 bits per pixel produces acceptable images.

Consider, for example, that in the system of FIG. 2, 24 bits are stored for each display pixel. At memory location 150, there are then 8 bits each for the red, green and blue components of the display pixel. The eight most significant bits of the VRAM memory location could be used to represent the red value, the next 8 bits represent the green value and the 8 least significant bits represent the blue value. Thus, 256 shades each of red, green and blue can be defined in a 24 bit per pixel system. When displaying the pixel at X0, Y0, the bit values at memory location 150 are provided to video driver 170. The bits corresponding to the R component are provided to the R driver, the bits representing the green component are provided to the G driver, and the bits representing the blue component are provided to the blue driver. These drivers activate the red, green and blue phosphors at the pixel location 190. The bit values for each color, red, green and blue, determine the intensity of that color in the display pixel. By varying the intensities of the red, green and blue components, different colors may be produced at that pixel location.

Many of the colors that can be defined in the color cube cannot actually be displayed or have differences perceived because of limitations on the responsiveness of the red, green and blue phosphors. One prior art attempt to provide a solution to this problem is to define a color space within the color cube that is optimized for human perception. One such color space is known as the YIQ color space which is used in the commercial color TV broadcasting system known as NTSC (National Television Standards Committee). The YIQ color space is a recoding of the RGB color space for transmission efficiency and also to provide compatibility with black and white television. The YIQ model is a 3D Cartesian coordinate system mapped into the RGB color cube. Transmission efficiency is achieved by reducing bandwidth in I and Q. The RGB to YIQ conversion that performs the mapping is defined by the following matrix equation:

$$\begin{bmatrix} Y \\ I \\ Q \end{bmatrix} = \begin{bmatrix} 0.299 & 0.587 & 0.114 \\ 0.60 & -0.28 & -0.32 \\ 0.21 & -0.52 & 0.31 \end{bmatrix} \cdot \begin{bmatrix} R \\ G \\ B \end{bmatrix} \quad [1]$$

The inverse of the matrix is used for the reverse conversion. The Y axis of the YIQ color model represents the luminance of the display pixel, and matches the luminosity response curve for the human eye. In a black and white receiver, only the Y value is used. In a color receiver, all three axes are used to provide display information.

In operation, an image may be recorded with a color camera, which is an RGB system, and converted to YIQ for transmission. At the receiver, the YIQ information is then retransformed into RGB information to drive the color display.

Whereas the RGB and YIQ color spaces are defined to meet hardware constraints, a more user-intuitive model is desired that reflects a graphic artist's feel for tint, shade, and tone. One such color space definition is the HSV color space, which is described along with YIQ color space on pages 613–616 of "Fundamentals of Interactive Computer Graphics," by J. D. Foley and A. Van Dam, published by Addison-Wesley Publishing Company in 1984.

The HSV color space has three parameters (or components): hue, saturation, and value. The HSV color space can be represented by hexagonal cone, as illustrated in FIG. 3, wherein the central axis is the V (value) axis. The apex of the cone is at V=0, and represents black, or (0,0,0) on the RGB cube. The base of the cone is at V=1. The cone may be separated into hexagonal planes (or hexagons) of constant V, e.g., hexagon 300 of FIG. 3. The value for V is calculated from the RGB components by simply taking the maximum value of the RGB components.

The saturation parameter S is a ratio, ranging from S=0 at the center of the hexagons (i.e., along the V axis), to S=1 at the edges. The point (S=0, V=1) represents white, and corresponds to (1,1,1) on the RGB cube. Intermediate values of V at S=0 correspond to grays. The value for S is calculated by subtracting the minimum RGB value from the maximum RGB value, and then dividing by the maximum RGB value (or V value):

$$S=[\max(R,G,B)-\min(R,G,B)]/\max(R,G,B) \quad [2]$$

The hue parameter H determines the pigment content of the color. Hue is measured as the angular rotation about the V axis. Each apex of the hexagons represents either a primary color or a complement of one of the primary colors. To maintain the unitary range of the color model, a full rotation of 360° is equal to one, and a rotation of 180° is equal to one-half. The locations of the primary and complementary colors around the hue arc are red at H=0 (1), yellow at H=1/6, green at H=2/6, cyan at H=3/6, blue at H=4/6 and magenta at H=5/6. Pure pigments are located at the appropriate H value, where V=S=1. The hue value is determined from the RGB components based on which component is the greatest and which is the least.

FIG. 5 shows a hue line from H=0 to H=1, delineating the maximum and minimum RGB contributors over the hue range. The range is divided into regions I–VI for calculation of the hue value from the RGB components. These hue regions are bounded on either side by hue values representing the primary and complementary colors. These hue values also represent RGB values wherein two of the three RGB components are equal. (No hue value is indicated for R=G=B, because the associated saturation value is zero, indicating a color along the V-axis where hue is irrelevant.) The minimum and maximum components for the respective regions are outlined in the following table:

TABLE 1

| HUE CHARACTERISTICS | | |
|---|---|---|
| REGION | HUE RANGE | MINIMUM, MAXIMUM RGB |
| I | 0–1/6 | BLUE, RED |
| II | 1/6–2/6 | BLUE, GREEN |
| III | 2/6–3/6 | RED, GREEN |
| IV | 3/6–4/6 | RED, BLUE |
| V | 4/6–5/6 | GREEN, BLUE |
| VI | 5/6–6/6 | GREEN, RED |

One method for calculating hue is to determine the hue region containing the color based on the minimum and maximum RGB component values, and then to perform a calculation for the appropriate regional case. At the point where two of the three RGB components are equal, both equations for the adjoining regions will provide the same hue value. One possible set of calculations is given below:

$$\text{Region I: } H=[1-(R-G)/(R-B)](1/6) \quad [3]$$

$$\text{Region II: } H=[1+(G-R)/(G-B)](1/6) \quad [4]$$

$$\text{Region III: } H=[3-(G-B)/(G-R)](1/6) \quad [5]$$

$$\text{Region IV: } H=[3+(B-G)/(B-R)](1/6) \quad [6]$$

$$\text{Region V: } H=[5-(B-R)/(B-G)](1/6) \quad [7]$$

$$\text{Region VI: } H=[5+(R-B)/(R-G)](1/6) \quad [8]$$

Under the HSV model, for constant value (V) at constant saturation, the RGB values over the hue range are simply defined. Each R, G and B value is equal to V for the one-third of the hue range centered on its pure pigment hue value (e.g., H=0 for R), equal to the minimum value for the one-third of the hue range centered around the pure complement pigment hue value, and transitioning linearly between the minimum value and V in the remaining portions of the hue range.

FIGS. 4A–4C are graphs of the individual RGB component values versus hue at saturation S=1 and value V=1. As shown in FIG. 4A, the red component (R) of the RGB value has a constant value of R=1 from H=0 to H=1/6, and from H=5/6 to H=1. At H=1/6, the red component ramps down to R=0 at H=2/6. R remains constant at R=0 from H=2/6 to H=4/6, then ramps up to R=1 at H=5/6.

In FIG. 4B, the green component (G) of the RGB value is G=0 at H=0, but ramps up to G=1 at H=1/6. From H=1/6 to H=3/6, the green component is constant at G=1. Between H=3/6 and H=4/6, the green component ramps down from G=1 to G=0, and from H=4/6 to H=1, the green component remains constant at G=0.

In FIG. 4C, the blue component (B) of the RGB value is B=0 from H=0 to H=2/6, then ramps up to B=1 at H=3/6. The blue component remains constant at B=1 from H=3/6 to H=5/6, then ramps down to B=0 at H=1.

With the HSV color model, color description and manipulation are user intuitive. For instance, adding black pigment corresponds to decreasing value without changing saturation. Adding white pigment corresponds to decreasing saturation without changing value. Tones can be created by decreasing both saturation and value. Selecting hue corresponds to selecting the pure pigment from which to start.

Unfortunately, the prior art intuitive color models, such as HSV, do not account for the luminosity response curve of the human eye. The human eye is far more responsive to light at wavelengths corresponding to green than to light at wavelengths corresponding to red or blue. Because of this, colors with equal value (V) appear more luminous if they are in the green hue region, than if they are in the blue or red region. Value is easily understood from a mathematical standpoint, but far from intuitive for the graphic artist. For instance, on the hue wheel, certain regions of the wheel will appear brighter, despite having a constant value (V). This is undesired from a graphic artist's standpoint.

In general, luminance can be calculated from RGB values as follows:

$$Y = k_R(R) + k_G(G) + k_B(B) \qquad [9]$$

where $k_R$, $k_G$ and $k_B$ are constants determined by the specific intensities generated by the luminance response of the human eye (called the luminous efficiency function) and the characteristics of a given display system.

One definition of k is that used for commercial National Television Standards Committee (NTSC) broadcast video. Here, luminance is defined by the YIQ color space and was based on the display devices currently in use when the standard was written. The coefficient values can be taken from the RGB to YIQ color space transformation: $k_{(RGB)}$= (0.298939 0.586625 0.114436). These values are commonly rounded to $k_{(RGB)}$=(0.299 0.587 0.114).

The International Telecommunications Union (ITU) Recommendation BT. 709, "Basic Parameter Values for the HDTV (High Definition Standard) Standard for the Studio and for International Program Exchange" defines luminance with $k_{(RGB)}$=(0.212671 0.715160 0.072169). In any case, the primary driving force in determining the coefficients is the non-uniform response of the human eye to the light in the red, green and blue parts of the spectrum. As a result, the green coefficient, $k_G$, will always be the largest, $k_R$ will be intermediate, and $k_B$ will be the smallest.

Applying the NTSC luminosity equation to the RGB values of FIGS. 4A–4C for S=V=1 illustrates the disparity between value (V) and luminance (Y) over the hue range. Table 2 below provides approximate luminance values for the primary and complementary pigment points around the hue wheel.

TABLE 2

HSV LUMINANCE VALUES

| HUE (H) | LUMINANCE (Y) (@ S=V=1) |
|---|---|
| 0 | $k_R$ |
| 1/6 | $k_R + k_G$ |
| 2/6 | $k_G$ |
| 3/6 | $k_G + k_B$ |
| 4/6 | $k_B$ |
| 5/6 | $k_B + k_R$ |

The resulting NTSC luminance versus hue response is shown in FIG. 6. Luminosity is at a maximum around H=1/6 (yellow), and at a minimum around H=4/6 (blue), with luminosity at the maximum being roughly eight times that at the minimum. Further, the waveform is nonlinear, providing difficulty for the graphic artist in predicting luminance behavior.

Similarly, luminance is also a function of saturation in HSV space. For instance, at H=0 and V=1, the luminance value at S=0 (R=G=B=1) is $k_R+k_G+k_B$=1.0, and the luminance value at S=1 (R=1, G=B=0) is $k_R$. The relationship between saturation (S) and luminance (Y) at H=0 and V=1 can be expressed as:

$$Y = 1 - (1-k_R)S \qquad [10]$$

Therefore, for constant hue and value, as saturation is increased, the luminance decreases and the color appears visibly darker. Conversely, as the saturation decreases, the luminance increases and the color appears visibly brighter.

Thus, though HSV provides for independent manipulation of hue, saturation and value, the eye of the graphic artist registers an unwanted and non-intuitive dependence between hue and luminance, and saturation and luminance.

SUMMARY OF THE INVENTION

The present invention provides a method for manipulating color values in a computer graphics system. Colors are mapped into a color space referred to as "HSY space," which provides independent control over the orthogonal parameters of hue, saturation and luminance. The intuitive color description qualities of hue and saturation are retained in combination with the luminance parameter, which is specifically tuned to the response of the human eye (referred to as the luminous efficiency function) and the characteristics of a given display system. The present invention thus provides ease of use for the graphic artist without the hue and saturation dependent luminance response of prior art methods.

In the present invention, color image data in HSY format is manipulated by a color graphics editing or rendering process by altering hue, saturation and luminance individually. The graphic artist is thus able to select the appropriate color by using tints, shades and tones. In one embodiment, HSY color data is converted into a second color data format, such as RGB, for display or storage purposes to meet the physical requirements of display devices. A reverse transformation is used to convert scanned image data in RGB format into HSY data for manipulation in HSY space by the editing process.

The unit RGB color space is a subspace of the unit HSY space. Because of this, many RGB values in HSY space are not displayable in standard RGB display units. The present invention provides first and second methods for mapping the unit HSY space into the RGB unit cube, by altering the luminance of the color or by altering the saturation of the color, respectively.

DETAILED DESCRIPTION OF THE INVENTION

A method and apparatus for providing intuitive manipulation of color data in computer graphics systems is described. In the following description, numerous specific details are set forth in detail to provide a more thorough description of the invention. It will be apparent, however, to one skilled in the art, that this invention can be practiced without these specific details. In other instances, well known features have not been described in detail so as not to unnecessarily obscure the invention.

Figure 15:
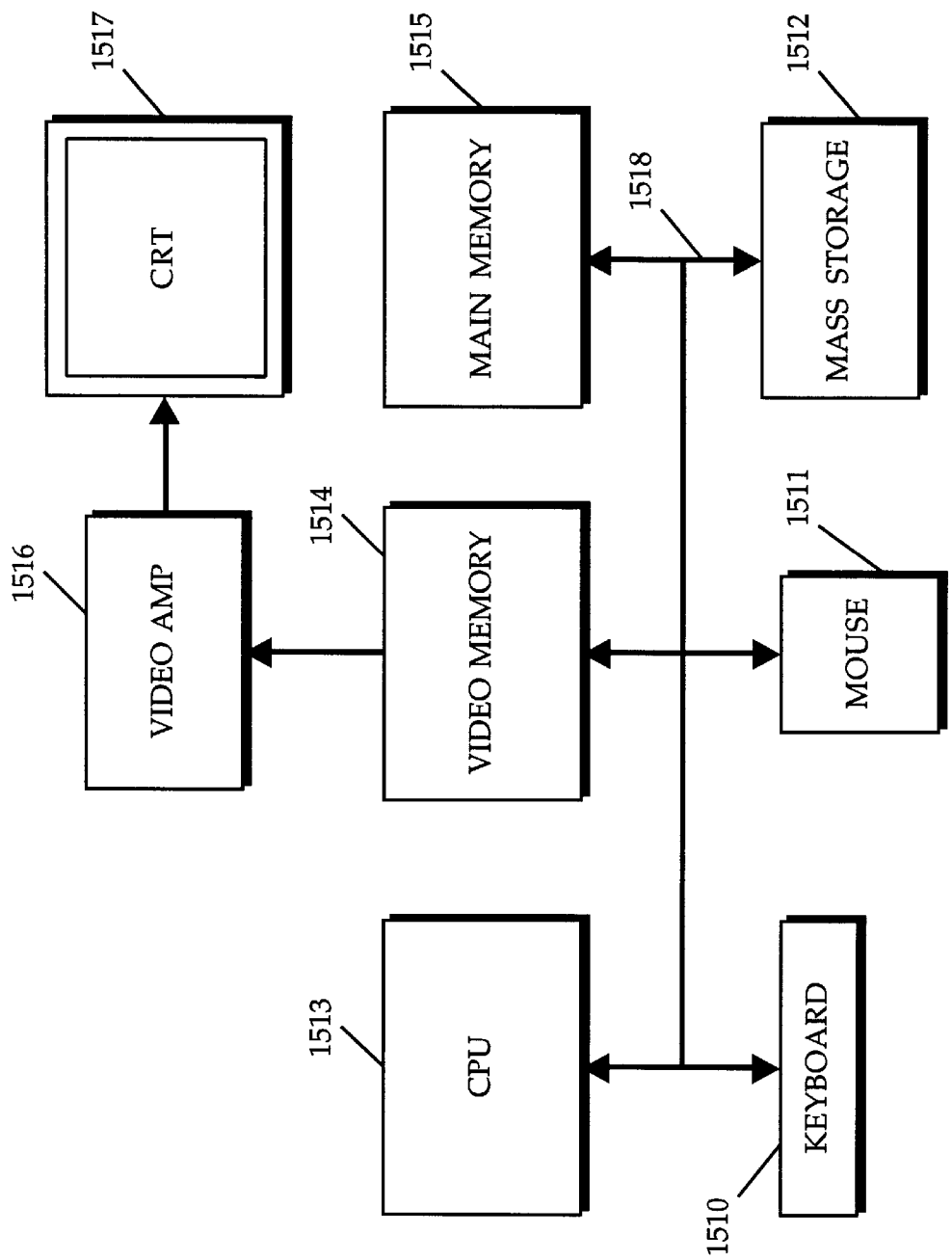
FIG. 15 is a block diagram of a computer system suitable for implementing the method and apparatus of the present invention.

The present invention can be implemented on a general purpose computer such as illustrated in FIG. 15. A keyboard 1510 and mouse 1511 are coupled to a bi-directional system bus 1518. The keyboard and mouse are for introducing user input to the computer system and communicating that user input to central processing unit (CPU) 1513. The computer system of FIG. 15 also includes a video memory 1514, main memory 1515 and mass storage 1512, all coupled to bi-directional system bus 1518 along with keyboard 1510, mouse 1511 and CPU 1513. The mass storage 1512 may include both fixed and removable media, such as magnetic, optical or magnetic optical storage systems or any other available mass storage technology. Bus 1518 may contain, for example, thirty-two address lines for addressing video memory 1514 or main memory 1515. The system bus 1518 also includes, for example, a 32-bit data bus for transferring data between and among the components, such as CPU 1513, main memory 1515, video memory 1514 and mass storage 1512. Alternatively, multiplex data/address lines may be used instead of separate data and address lines.

In the preferred embodiment of this invention, the CPU 1513 is a 32-bit microprocessor manufactured by Motorola, such as the 680X0 processor or a microprocessor manufactured by Intel, such as the 80X86, or Pentium processor. However, any other suitable microprocessor or microcomputer may be utilized. Main memory 1515 is comprised of dynamic random access memory (DRAM). Video memory 1514 is a dual-ported video random access memory. One port of the video memory 1514 is coupled to video amplifier 1516. The video amplifier 1516 is used to drive the cathode ray tube (CRT) raster monitor 1517. Video amplifier 1516 is well known in the art and may be implemented by any suitable means. This circuitry converts pixel data stored in video memory 1514 to a raster signal suitable for use by monitor 1517. Monitor 1517 is a type of monitor suitable for displaying graphic images.

The computer system described above is for purposes of example only. The present invention may be implemented in any type of computer system or programming or processing environment.

In the prior art, color models have been developed to conform to hardware constraints. Such hardware oriented color models are functional for standard display purposes, but provide difficulty for graphic artists wishing to edit scanned or rendered images in the computer. More intuitive models, such as HSV, were developed which applied the intuitive color parameters of hue and saturation to the color space, but provided a third parameter, such as "value," which was not intuitive to the graphic artist. An important aspect of human vision, perceived brightness, or luminosity, was not considered. Therefore, prior art intuitive models are subject to a perceived dependence between color editing parameters.

The present invention provides a color model wherein the three color parameters are orthogonal mathematically and perceptually, providing a mechanism for manipulating color that provides three independent and intuitive parameters for the color space. A software process running in the CPU (central processing unit) of the host computer provides a transformation between the color data (typically RGB) in RAM or VRAM into HSY space for manipulation in an image manipulation program such as a graphics editor or renderer.

Figure 1:
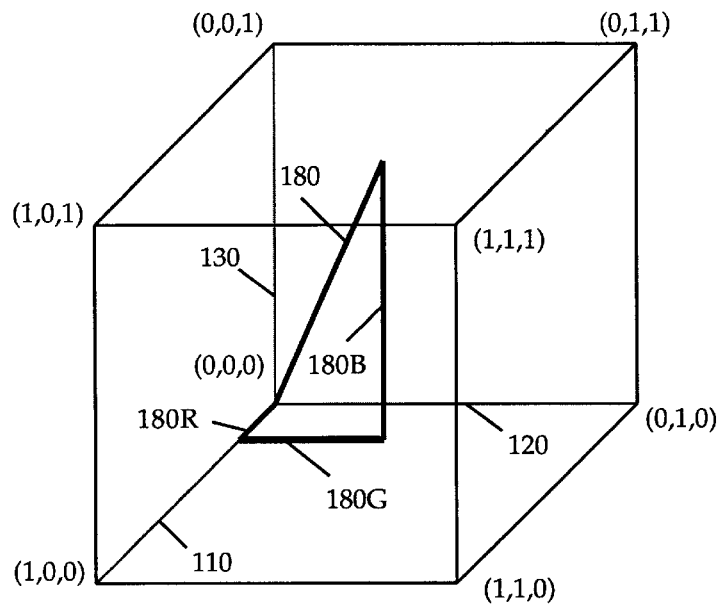
FIG. 1 illustrates an RGB color cube in RGB color space.
Figure 2:
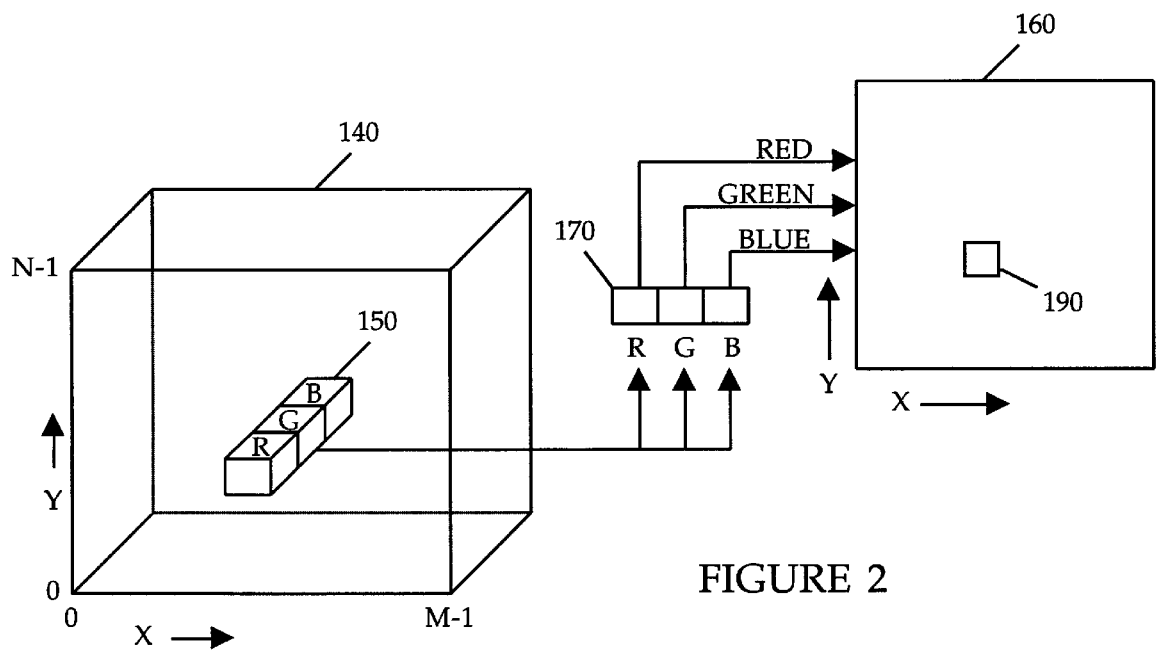
FIG. 2 is a block diagram illustrating a prior art RGB color display system.
Figure 3:
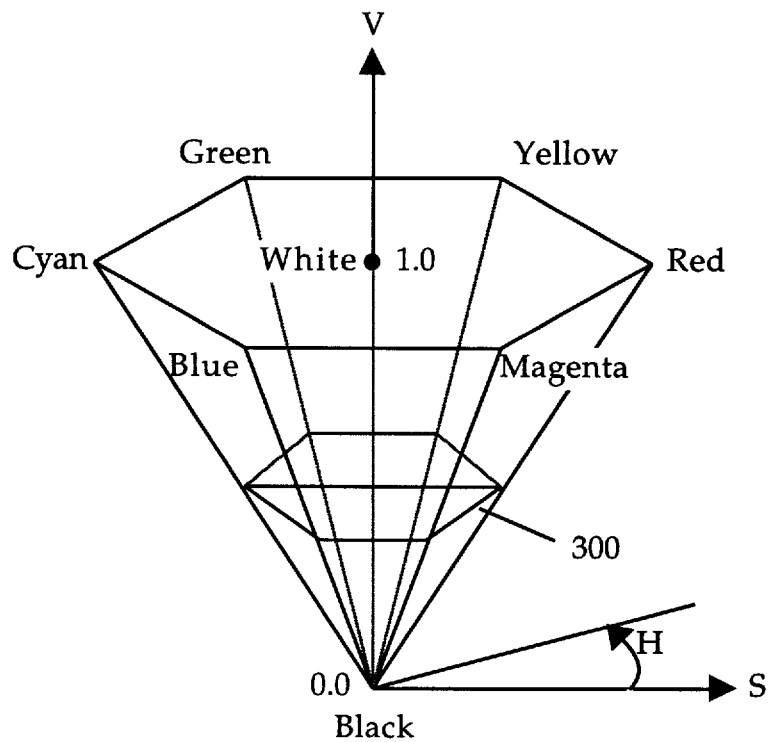
FIG. 3 illustrates the hexcone of HSV color space.
Figure 13:
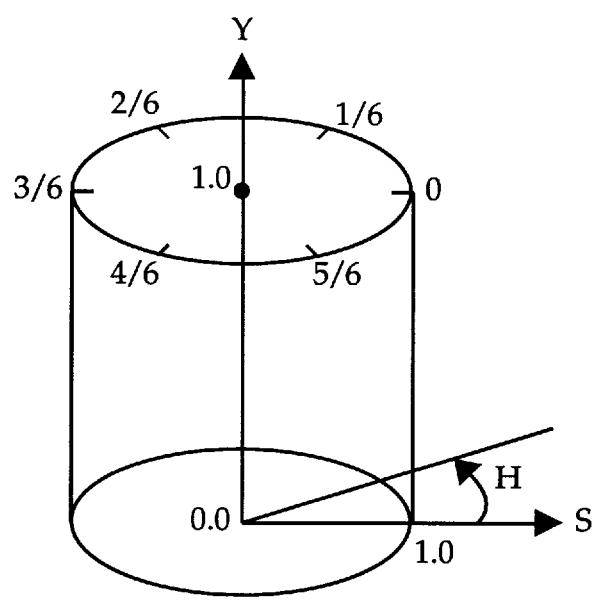
FIG. 13 is a diagram of the cylindrical HSY space.
Figure 4A:
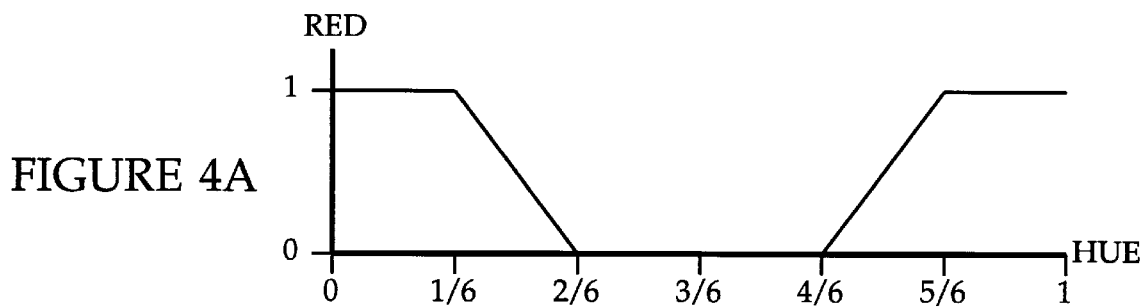
FIG. 4A is a graph of R versus H for HSV color space at S=V=1.
Figure 4B:
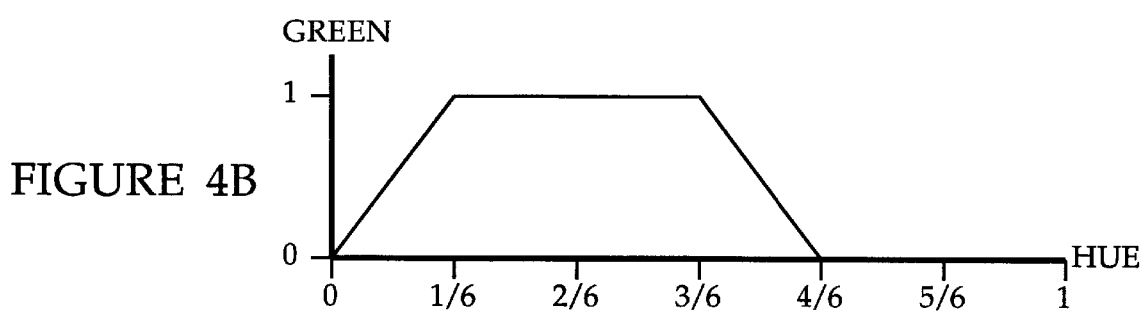
FIG. 4B is a graph of G versus H for HSV color space at S=V=1.
Figure 4C:
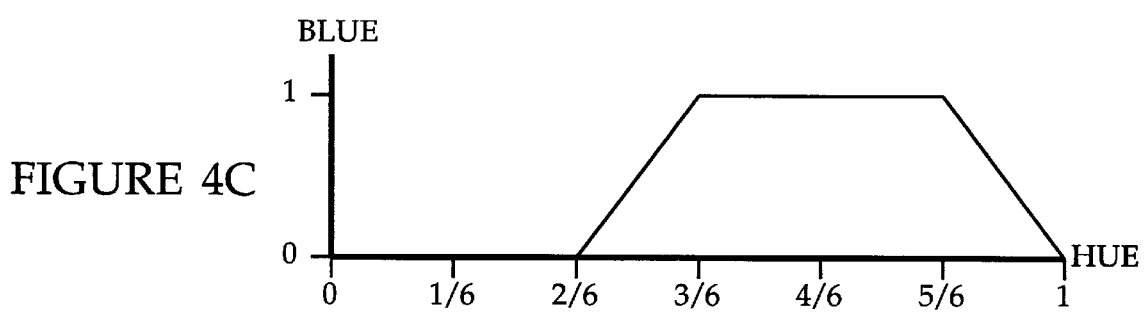
FIG. 4C is a graph of B versus H for HSV color space at S=V=1.
Figure 6:
FIG. 6 is a graph of NTSC luminance versus hue in HSV color space at S=V=1.

The color space of the present invention is referred to as HSY space because it provides hue (H) and saturation (S) values, as well as a luminance value (Y). Whereas HSV is described in terms of a hexcone, the HSY space may be represented as a cylindrical space, as shown in FIG. 13, wherein the radial coordinate is saturation, the angular coordinate is hue and the orthogonal central axis is luminance. For each parameter H, S and Y, the range is between zero and one. The unit RGB cube comprises a subspace within this "unit cylinder."

In HSY space, by definition, when saturation is equal to one, the minimum RGB component is zero. Also, when the saturation value is zero, $$R=G=B=\text{luminance }(Y). \quad [11]$$

Further, luminance is defined as:

$$Y=k_R(R)+k_G(G)+k_B(B) \quad [12]$$

The definition for hue is illustrated by providing a three dimensional space wherein hue, saturation and the respective R, G or B value form orthogonal axes. The hue and saturation parameters have a range between zero and one. However, to provide luminance with a range of zero to one, RGB values are not constrained between zero and one. Red values have a range between zero and $1/k_R$, green values have a range between zero and $1/k_G$, and blue values have a range between zero and $1/k_B$.

Figure 5:
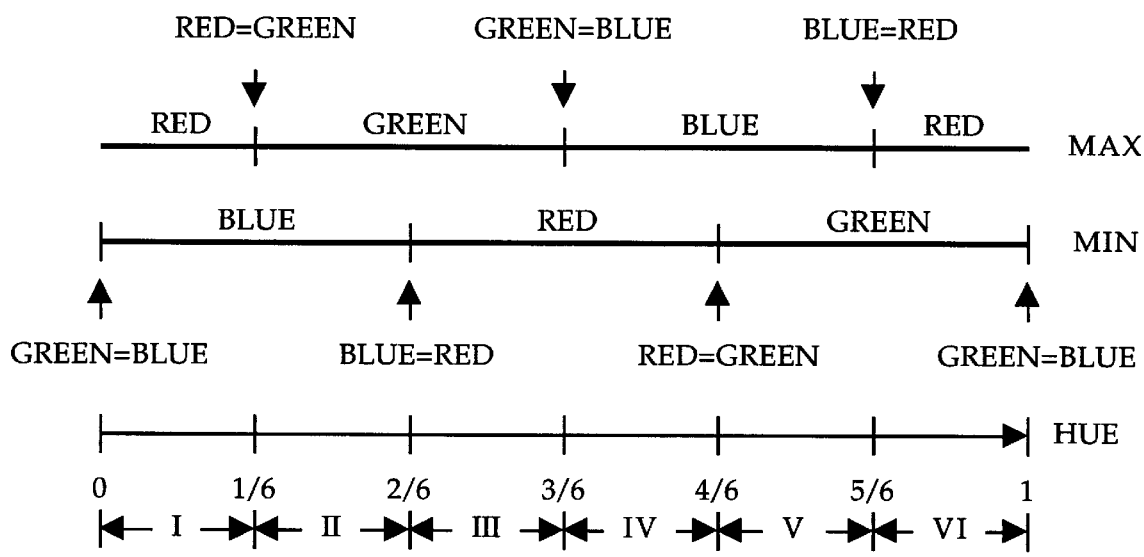
FIG. 5 is a hue line diagram showing the minimum and maximum RGB components versus hue.
Figure 7A:
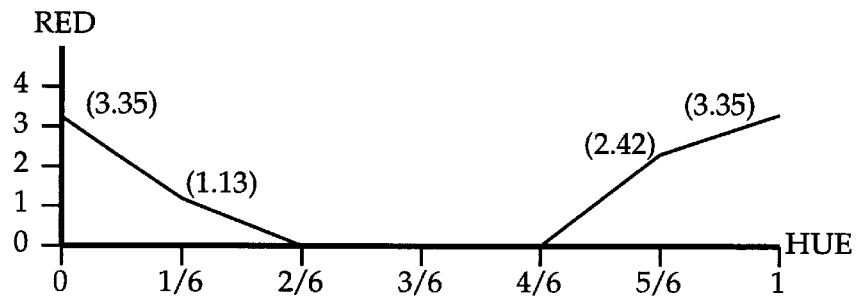
FIG. 7A is a graph of R versus H for NTSC HSY color space at S=Y=1.
Figure 7B:
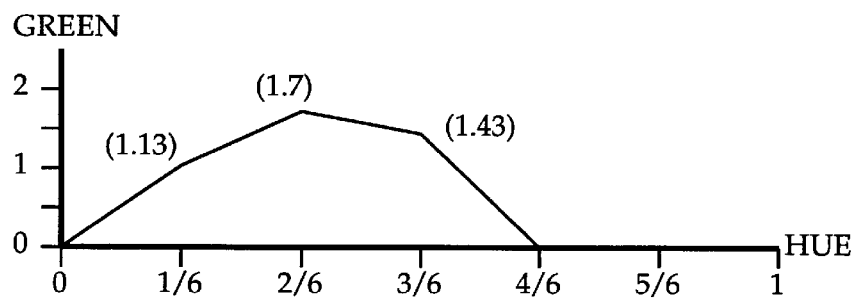
FIG. 7B is a graph of G versus H for NTSC HSY color space at S=Y=1.
Figure 7C:
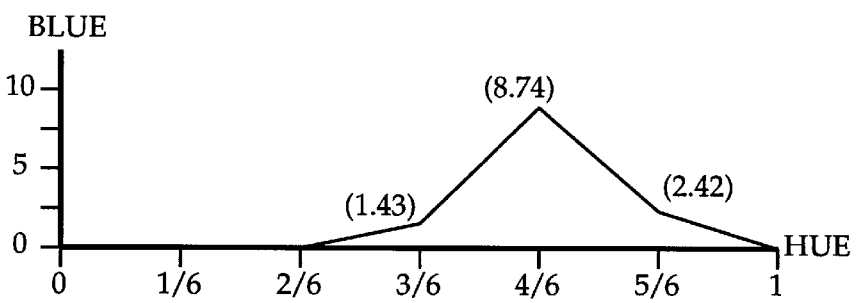
FIG. 7C is a graph of B versus H for NTSC HSY color space at S=Y=1.
Figure 8:
FIG. 8 is a graph of luminance versus hue in HSY color space.

FIGS. 7A–7C illustrate the NTSC based definition for hue at S=Y=1. These three figures conform to the hue characteristic behavior of FIG. 5 for minimums and maximums, but are constrained to provide a constant luminance over hue as shown in FIG. 8. The R, G and B values over the hue range are piecewise linear in regions I–VI. Therefore, at S=1, the R, G and B values can be characterized by their respective values at the boundaries of these regions. Values within these regions can be extracted by linearly interpolating between the regional boundary values. The NTSC based boundary values for R, G and B at S=1 are shown in Table 3.

TABLE 3

HSY HUE BOUNDARY VALUES (@ S=1, Y=1)

| HUE (H) | RED (R) | GREEN (G) | BLUE (B) |
|---|---|---|---|
| 0 | $1/k_R$ = 3.34516 | 0 | 0 |
| 1/6 | $1/(k_R + k_G)$ = 1.12922 | $1/(k_R + k_G)$ = 1.12922 | 0 |
| 2/6 | 0 | $1/k_G$ = 1.70467 | 0 |
| 3/6 | 0 | $1/(k_G + k_B)$ = 1.42641 | $1/(k_G + k_B)$ = 1.42641 |
| 4/6 | 0 | 0 | $1/k_B$ = 8.73851 |
| 5/6 | $1/(k_B + k_R)$ = 2.41911 | 0 | $1/(k_B + k_R)$ = 2.41911 |
| 1 | $1/k_R$ = 3.34516 | 0 | 0 |

For a RGB value at S=1 and Y=1, such as red R', residing at hue H' within hue values $H_L$ and $H_H$, where $H_L$ is the lower hue boundary value of a hue region and $H_H$ is the upper hue boundary value of the region, and knowing the values of R ($R_L$ and $R_H$) at the lower and upper boundaries, the following linear equations can be used to calculate R' given H', or vice versa.

$$R'=6[(R_H-R_L)(H'-H_L)]+R_L \quad [13]$$

$$H'=(R'-R_L)/[6(R_H-R_L)]+H_L \quad [14]$$

Similar equations may be derived for blue B' and green G' values.

The hue definition at saturation S=0 is defined as R=G=B=Y across the hue range. A series of constant luminance, bilinear surfaces are formed in the three dimensional space by linearly interpolating all R, G and B values over the saturation range based upon their respective values at S=0 and S=1 for the respective hue value.

Figure 9A:
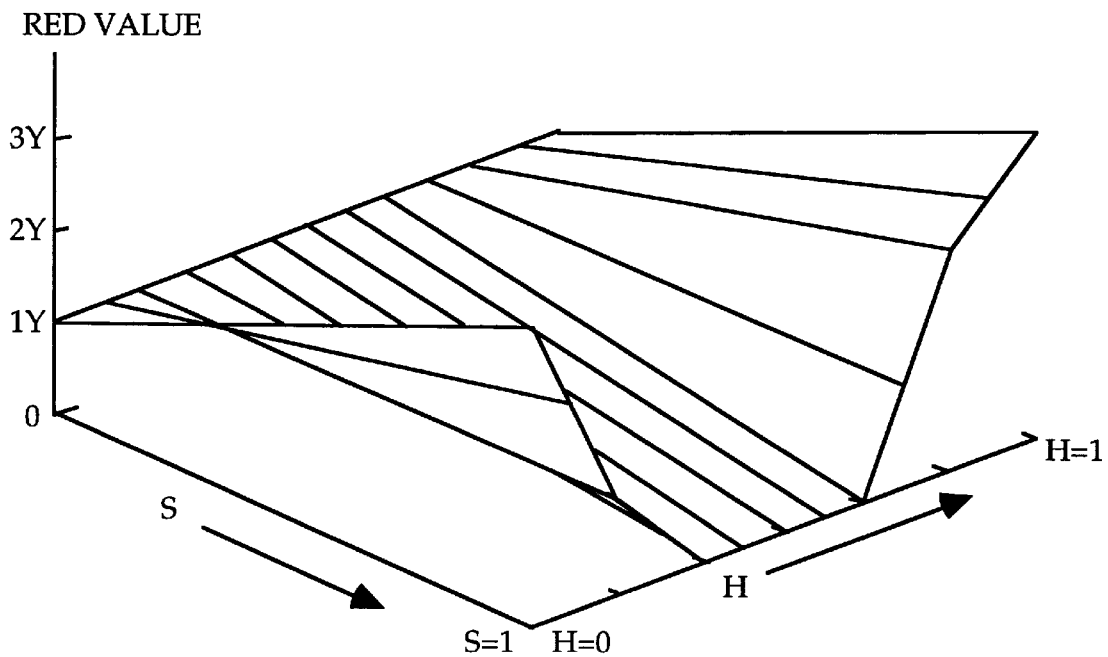
FIG. 9A is a graph of R in terms of NTSC luminance versus H and S in HSY color space.
Figure 9B:
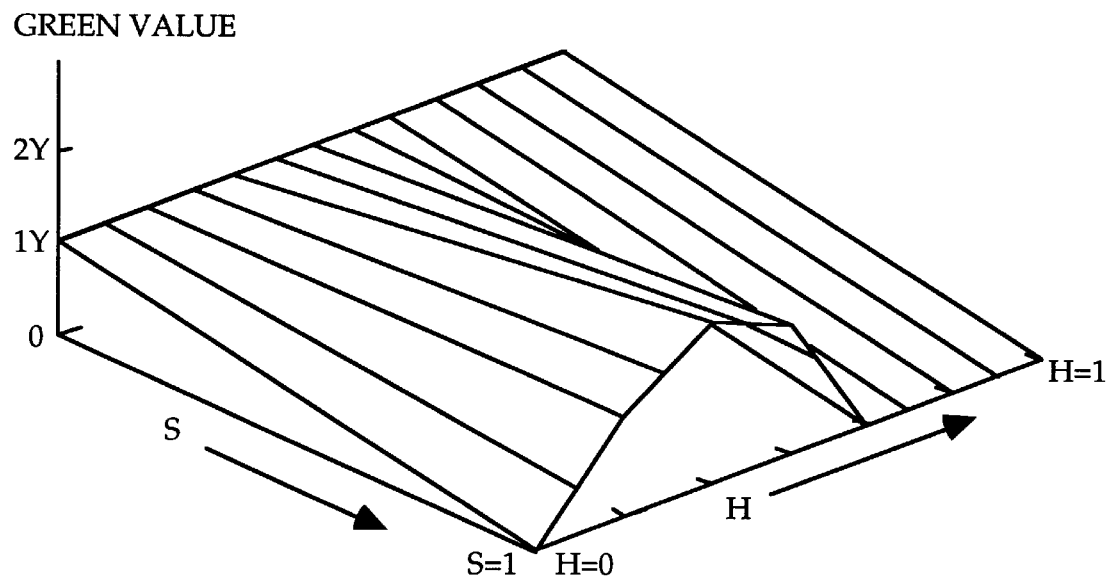
FIG. 9B is a graph of G in terms of NTSC luminance versus H and S in HSY color space.
Figure 9C:
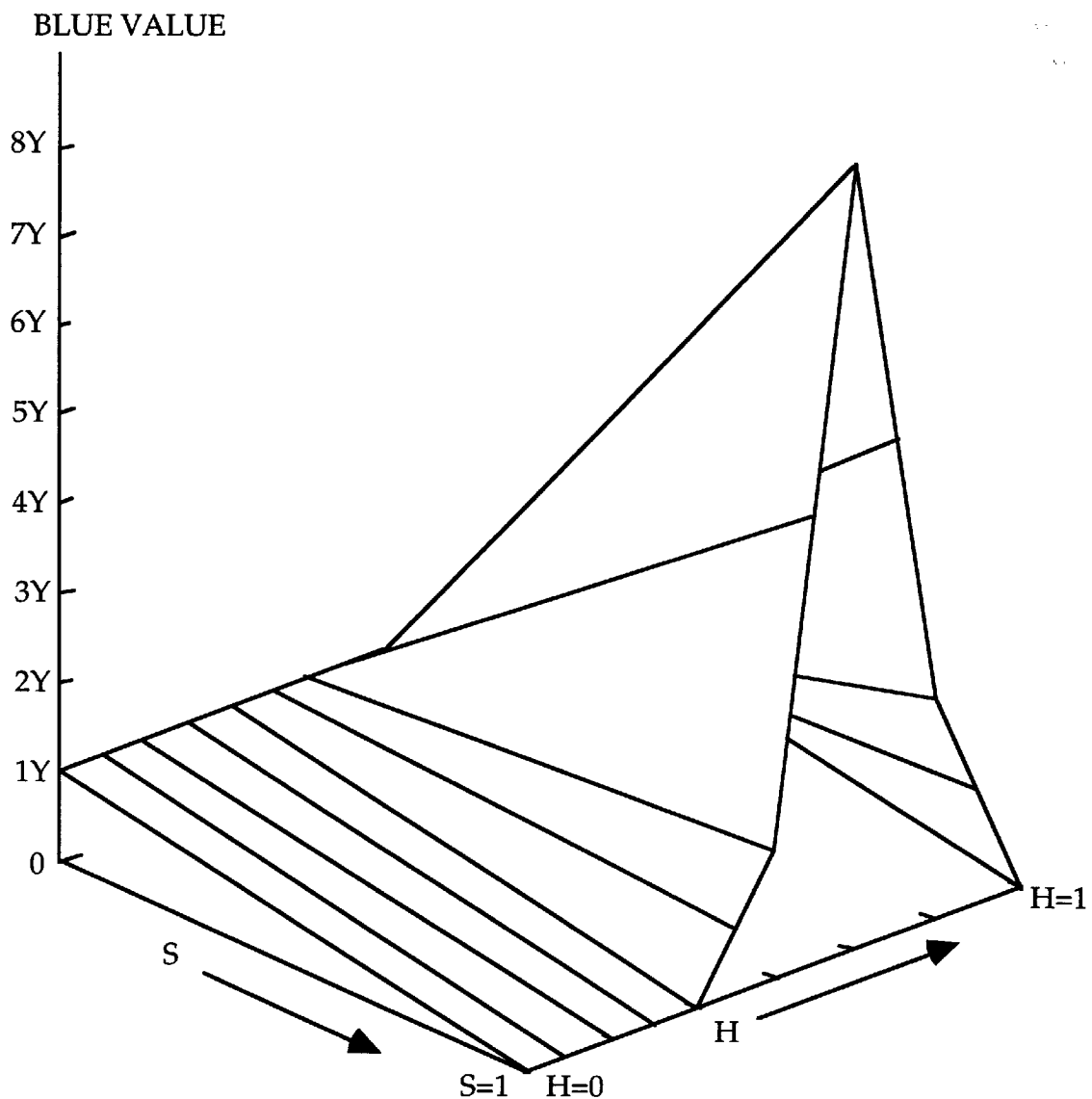
FIG. 9C is a graph of B in terms of NTSC luminance versus H and S in HSY color space.

These bilinear surfaces are shown in FIGS. 9A–9C, which show R, G and B component values respectively versus hue and saturation in HSY color space. The RGB components are scaled by NTSC luminance on the vertical axis to illustrate the R, G and B surfaces for all H, S and Y values. However, at zero luminance, the saturation is also zero, and hue is typically set to zero for convenience.

RGB to HSY Conversion

Figure 10:
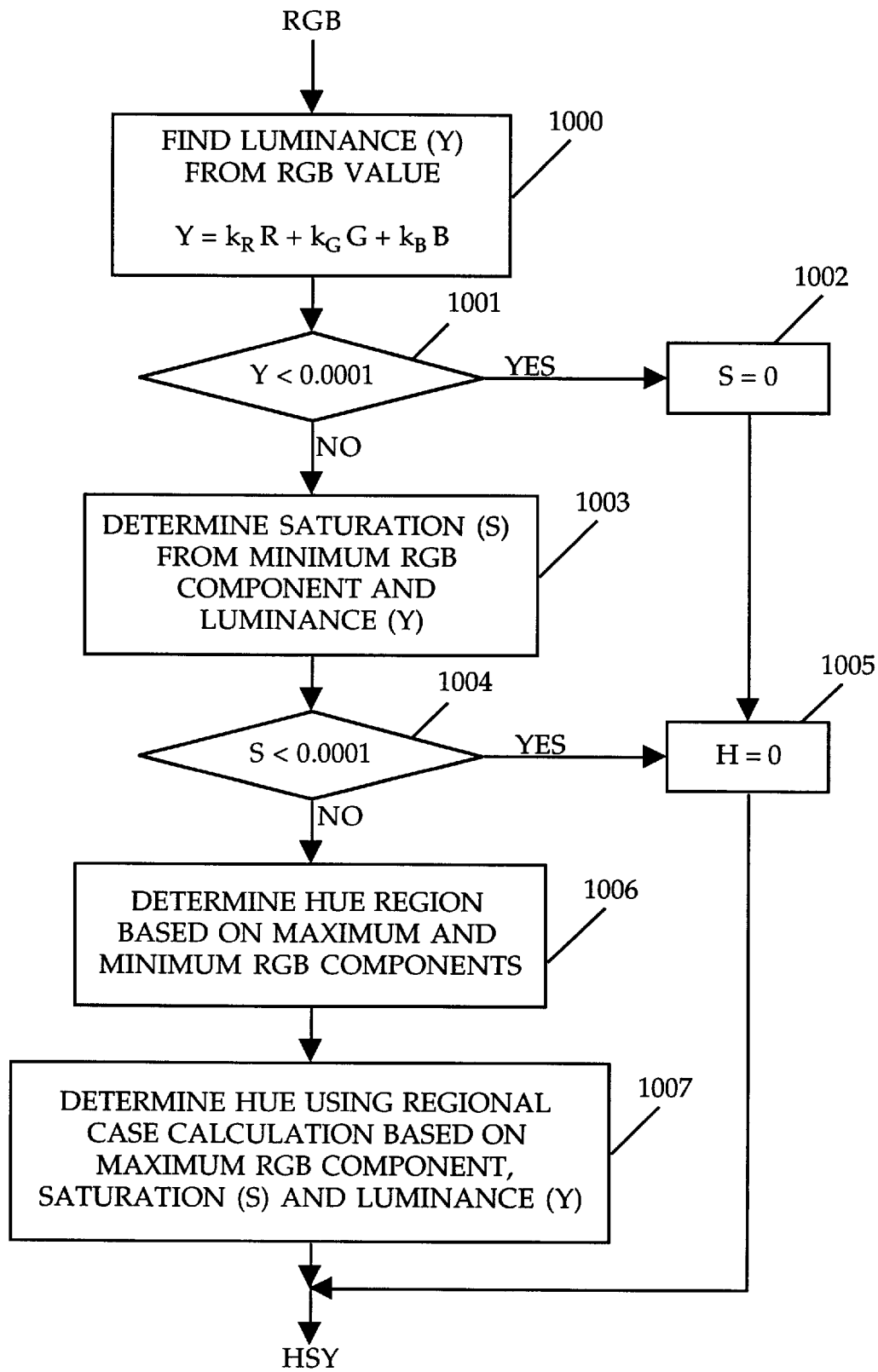
FIG. 10 is a flow diagram of the RGB to HSY transformation process.

When data is stored in memory in RGB format, a transformation is required to change RGB values taken from memory into HSY values used for color manipulation. FIG. 10 is a flow diagram of an embodiment of the transformation process for transforming RGB color data into HSY color data.

In FIG. 10, the RGB pixel data is read from memory and processed by software as follows. In block 1000, luminance (Y) is calculated directly from the RGB values according to luminance equation [12]. In subsequent block 1001, the luminance value is checked to determine if luminance is effectively zero. This can be computationally performed by comparing luminance (Y) with a very small threshold, such as 0.0001. If the luminance is less than the threshold, then the saturation value S is set to zero in block 1002, and the process moves to block 1005, where the hue value H is also set to zero to complete the transformation. However, if, in block 1001, luminance is not less than the threshold, then, in block 1003, the saturation value is determined from the minimum RGB component value and the luminance value using the following linear equation:

$$S=1-\min(R,G,B)/Y \quad [15]$$

Equation [15] results from knowing from the definition for saturation that the minimum RGB component is zero when S=1, and that the minimum RGB component is equal to the luminance value (Y) at S=0. Linear interpolation based on these saturation boundary points produces equation [15].

After the saturation value has been set in block 1003, the saturation value is compared with a minimum threshold in block 1004 to differentiate between zero valued and non-zero valued saturation values. If the saturation value is zero-valued (i.e., less than the minimum threshold), then the process branches to block 1005 to assign a zero hue value. If the saturation value is non-zero (i.e., larger than the minimum threshold), then the appropriate hue region is determined in block 1006 based on the maximum and minimum RGB components. The hue characteristics for this determination are provided in FIG. 5 and Table 1. After the appropriate hue region is determined, in block 1007, the hue value is calculated based on an RGB component value (not the minimum value), and the calculated saturation and luminance values. A computer graphics artist or transparent software process, such as a shading routine, may then manipulate the hue, saturation and luminance of the color data by altering the appropriate HSY component.

With respect to blocks 1002 and 1005 of FIG. 10, the assignment of zero values to hue and saturation is performed in initialization situations, e.g., when an RGB value is first transformed into the HSY color space. In a manipulation operation, the saturation and hue values are typically not reset to zero when the luminance value is reduced to a substantially zero value. This prevents a color manipulation process from altering hue and saturation values when the luminance value has been adjusted in the vicinity of zero. For instance, in most applications, one does not typically want to reset the hue from a yellow value to a red value when a luminance control is reduced to zero and then raised again. Such a reset is not necessary in situations where previous hue and saturation data exist. Similarly, hue is not typically reset when the saturation value is varied near zero.

Referring to FIGS. 9A–9C, each hue region has unique bilinear surfaces representing the red, green and blue color components as a function of hue, saturation and luminance. These surfaces can be represented by the following regional functions:

$$R_f=f_i(H,S,Y) \quad [16]$$

$$G_f=g_i(H,S,Y) \quad [17]$$

$$B_f=h_i(H,S,Y) \quad [18]$$

$R_{II} = f_{II}(H,S,Y)$ [19]

$G_{II} = g_{II}(H,S,Y)$ [20]

$B_{II} = h_{II}(H,S,Y)$ [21]

.

.

.

$R_{VI} = f_{VI}(H,S,Y)$ [22]

$G_{VI} = g_{VI}(H,S,Y)$ [23]

$B_{VI} = h_{VI}(H,S,Y)$ [24]

Solving the above equations for hue provides the following new equations for hue with respect to the respective RGB component for the surface, the saturation value and the luminance value.

$H_I = f'_I(R,S,Y)$ [25]

$H_I = g'_I(G,S,Y)$ [26]

$H_I = h'_I(B,S,Y)$ [27]

.

.

.

$H_{VI} = f'_{VI}(R,S,Y)$ [28]

$H_{VI} = g'_{VI}(G,S,Y)$ [29]

$H_{VI} = h'_{VI}(B,S,Y)$ [30]

For each hue region, there are three possible solutions for hue based on the three different RGB components. Looking at the definition for hue, it can be seen that the solution which is a function of the minimum RGB component is not determinative because it is flat with respect to hue, i.e., there is no change in the minimum RGB component as hue changes. This leaves the two remaining functions as possible solutions for calculating hue. For an embodiment utilizing the hue function based on the maximum RGB component, the following functions are used for hue regions I–VI:

| HUE REGION | CHOSEN FUNCTION | |
| --- | --- | --- |
| I | $H_I = f'_I (R,S,Y)$ | [31] |
| II | $H_{II} = g'_{II} (G,S,Y)$ | [32] |
| III | $H_{III} = g'_{III} (G,S,Y)$ | [33] |
| IV | $H_{IV} = h'_{IV} (B,S,Y)$ | [34] |
| V | $H_V = h'_V (B,S,Y)$ | [35] |
| VI | $H_{VI} = f'_{VI} (R,S,Y)$ | [36] |

To generate the above functions, a linear equation is used to determine the value of the RGB component at S=Y=1. For example, in region I, the R value of the RGB triple is used to determine $R_S$, the red value for the same hue at S=Y=1.

$R_S = (R-Y)/(SY) + 1$ [37]

Combining the above equation with equation [14] yields the following general hue equation:

$H_I = f'_I(R,S,Y) = \{[(R-Y)/(SY) + 1 - R_L]/(R_H - R_L)\} \cdot (1/6) + H_L$ [38]

Similar equations are derived using linear equations for the remaining regions. Inserting the boundary values for HSY color space from Table 3, the following case set is generated:

$H_I = f'_I(R,S,Y)$ [39]
$= \{[(R - Y)/(SY) + 1 - 1/k_R]/[6(1/(k_R + k_G) - 1/k_R)]\}$ $H_{II} = g'_{II}(G,S,Y)$ [40]
$= \{[(G - Y)/(SY) + (1 - 1/(k_R + k_G))]/[6(1/k_G - 1/(k_R + k_G))]\} + 1/6$ $H_{III} = g'_{III}(G,S,Y)$ [41]
$= \{[(G - Y)/(SY) + 1 - 1/k_G]/[6(1/(k_G - k_B) - 1/k_G)]\} + 2/6$ $H_{IV} = h'_{IV}(B,S,Y)$ [42]
$= \{[(B - Y)/(SY) + 1 - 1/(k_G + k_B)]/[6(1/k_B - 1/(k_G + k_B))]\} + 3/6$ $H_V = h'_V(B,S,Y)$ [43]
$= \{[(B - Y)/(SY) + 1 - 1/k_B]/[6(1/(k_B + k_R) - 1/k_B)]\} + 4/6$ $H_{VI} = f'_{VI}(R,S,Y)$ [44]
$= \{[(R - Y)/(SY) + 1 - 1/(k_{GB} k_R)]/[6(1/k_R - 1/(k_B + k_R))]\} + 5/6$

It will be obvious to one skilled in the art that similar equations may also be generated relative to $H_H$, rather than $H_L$.

A more computationally robust implementation chooses the function for hue in which the bilinear surface representing the given RGB component has an overall slope closest to one. This reduces as much as possible the scale factors (multipliers) and their concomitant potential for increasing roundoff error in the conversion. This is only an issue if fixed point computation of some form is used. Given floating point computations and eight or ten bit quantized RGB values used for display, this scheme is not necessary.

It will be obvious that image data can be created and stored in HSY format, and processed without the need for conversion from RGB to HSY color space. The image data is then transformed from HSY space into RGB space when necessary for display purposes.

HSY to RGB Conversion

HSY image data must be transformed back into RGB for physical display systems requiring RGB data format. Also, transformation may also be required when sending image data to another computer or process that operates only on RGB formats.

It will be obvious to one skilled in the art that transformations into non-HSY color spaces other than RGB are possible by transforming data from HSY space into RGB space, and then from RGB space into a third space using known transformations between RGB and the third space. The reverse process can be used to transform data from the third color space into HSY space. Also, using the definitions of each color space in terms of the RGB space, more straightforward transformation schemes for transforming directly between HSY space and a third color space can be mathematically derived without departing from the scope of the invention.

Figure 11:
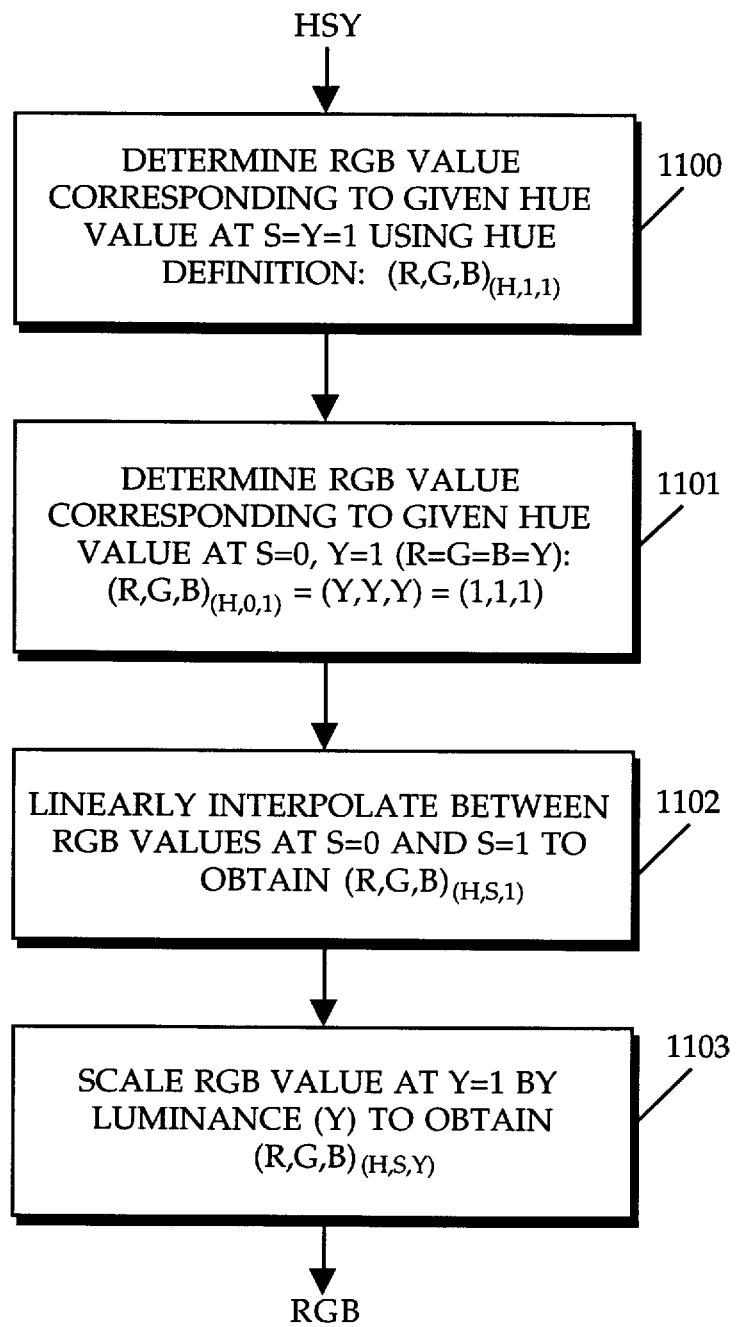
FIG. 11 is a flow diagram of the HSY to RGB transformation process.

FIG. 11 is a flow diagram of a transformation process for converting HSY color data into RGB color data. Given HSY color data (H,S,Y), in block 1100, the RGB component values corresponding to the given hue at S=Y=1 are determined from the hue definition. From equation [13], $$(R,G,B)_{(H,1,1)} = (6[(R_H - R_L)(H - H_L)] + R_L,$$
$$6[(G_H - G_L)(H - H_L)] + G_L,$$
$$6[(B_H - B_L)(H - H_L)] + B_L) \quad [45]$$

Applying the appropriate boundary values from Table 3 to equation [45] yields the appropriate RGB value at S=Y=1.

In block 1101, the RGB component values corresponding to the given hue at S=0, Y=1 are determined. From the definitions for HSY space, R=G=B=Y at saturation equals zero. Therefore, $$(R,G,B)_{(H,0,1)} = (Y,Y,Y) = (1,1,1) \quad [46]$$

In block 1102, the RGB component values corresponding to the given hue and saturation at Y=1 are determined by interpolating between the values determined in blocks 1100 and 1101. From the linear behavior across saturation, the following equation is generated.

$$\begin{aligned}(R,G,B)_{(H,S,1)} &= S \cdot (R,G,B)_{(H,1,1)} + (1 - S) \cdot (R,G,B)_{(H,0,1)} \quad [47] \\ &= S \cdot (R,G,B)_{(H,1,1)} + (1 - S) \cdot (1,1,1)\end{aligned}$$

Finally, because luminance is linear in RGB, in block 1103, the RGB component values determined from equation [47] in block 1102 are scaled by the luminance to provide the RGB value for the given hue, saturation and luminance. I.e., $$(R,G,B)_{(H,S,Y)} = Y \cdot (R,G,B)_{(H,S,1)} \quad [48]$$

For many purposes, the RGB value calculated in equation [48] is the final RGB value, and may be displayed as generated. However, because the RGB unit cube is only a subspace of the unit HSY color space, it is possible for some HSY values to exist outside of the RGB unit cube after the HSY to RGB transformation is completed. For instance, (4/6,1,1) in NTSC based HSY space corresponds to (0,0, 8.74) in RGB space.

Two methods for mapping the HSY color space within the RGB unit cube are provided below. The first method, referred to as HSy space, normalizes the luminance value to guarantee that the resulting RGB value resides in the RGB unit cube. The second method, referred to as HsY space, normalizes the saturation value to provide an RGB value within the RGB unit cube. Upper case letters indicate un-normalized components, whereas lower case letters indicate normalized components.

Figure 14:
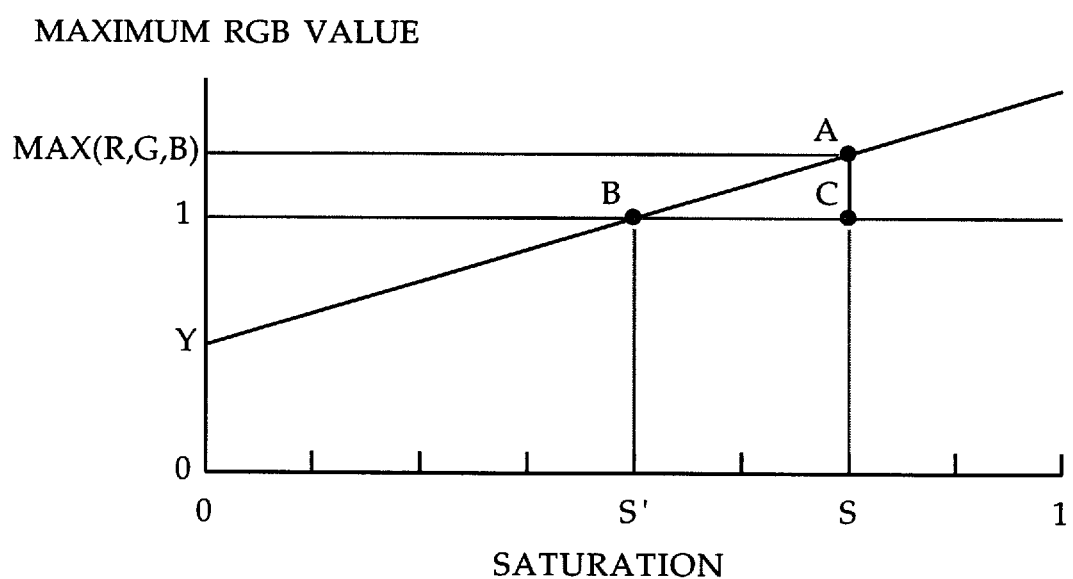
FIG. 14 is a graph illustrating the normalizing process for HSy and HsY space.

FIG. 14 is a graph of the maximum RGB component value versus saturation, illustrating how either the saturation value or the luminance value is normalized to bound the maximum RGB component value. A dashed line corresponding to [max(R,G,B)=1] indicates the maximum displayable RGB component value. A solid line containing the points (0,Y), (S',1) (labeled point "B") and (S,max[(RGB) $_{(H,S,Y)}$]) (labeled as point "A") indicates the constant luminance, constant hue line containing the RGB value.

The normalization of luminance for HSy conversion to RGB is performed by mapping point A into point C while maintaining constant hue and saturation. The new constant luminance surface containing point C, since luminance is linear in RGB, has a normalized luminance value Y' given below:

$$Y' = Y \cdot [1/\max(R,G,B)_{(H,S,Y)}] \quad [49]$$

The mapping function of HSy space is thus:

If $\max[(R,G,B)_{(H,S,Y)}] > 1$ then $(R,G,B)_{(H,s,y)} = [1/\max(R,G,B)_{(H,S,y)}] \cdot (R,G,B)_{(H,S,Y)}$ [50]

else $(R,G,B)_{(H,s,y)} = (R,G,B)_{(H,S,Y)}$ [51]

The normalization of saturation for HsY conversion to RGB is performed by mapping point A into point B while maintaining constant hue and luminance. A normalized saturation value S' is obtained where the constant luminance surface of the max$[(R,G,B)_{(H,S,Y)}]$ component is equal to one. Using the linear nature of the constant luminance surface, the normalized saturation value is calculated as follows:

$$S' = S(1-Y)/[\max(R,G,B)_{(H,S,Y)} - Y] \quad [52]$$

Using the values H, S' and Y, the conversion process to RGB is repeated to obtain a displayable RGB value. The mapping function for HsY space is thus:

If $\max[(R,G,B)_{(H,S,Y)}] > 1$ then $\begin{aligned}(R,G,B)_{(H,s,Y)} &= Y \cdot (R,G,B)_{(H,S',1)} \quad [53] \\ &= Y[S' \cdot (R,G,B)_{(H,1,1)} + (1 - S') \cdot (1,1,1)]\end{aligned}$ else $(R,G,B)_{(H,s,Y)} = (R,G,B)_{(H,S,Y)}$ [54]

Figure 12A:
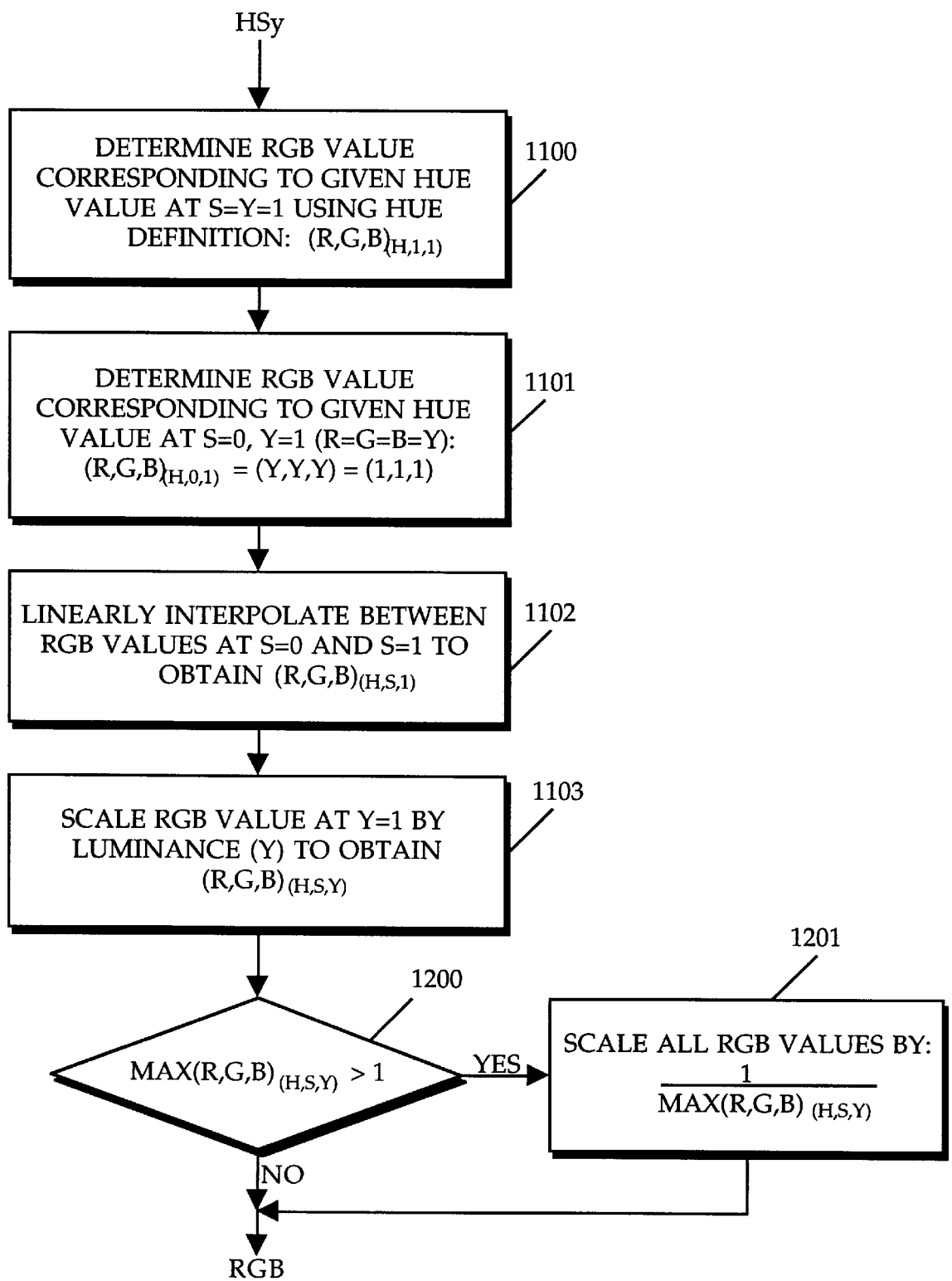
FIG. 12A is a flow diagram of a HSy to RGB transformation for mapping an HSY color into the RGB unit cube.

FIG. 12A shows the transformation process for conversion from HSy to RGB. The transformation from HSy space into RGB space is identical to the standard HSY to RGB transformation except for an additional normalization step after block 1103. The RGB value generated in block 1103 of FIG. 11 is passed to block 1200. In block 1200, the maximum RGB component is compared to one. If, in block 1200, the maximum RGB component value is not greater than one, then the RGB value calculated in block 1103 is maintained. However, if the maximum RGB component value is larger than one, then, in block 1201, all RGB component values are scaled by the reciprocal of the maximum RGB component value, effectively normalizing luminance to the maximum value that generates a displayable RGB value for the given hue and saturation.

Figure 12B:
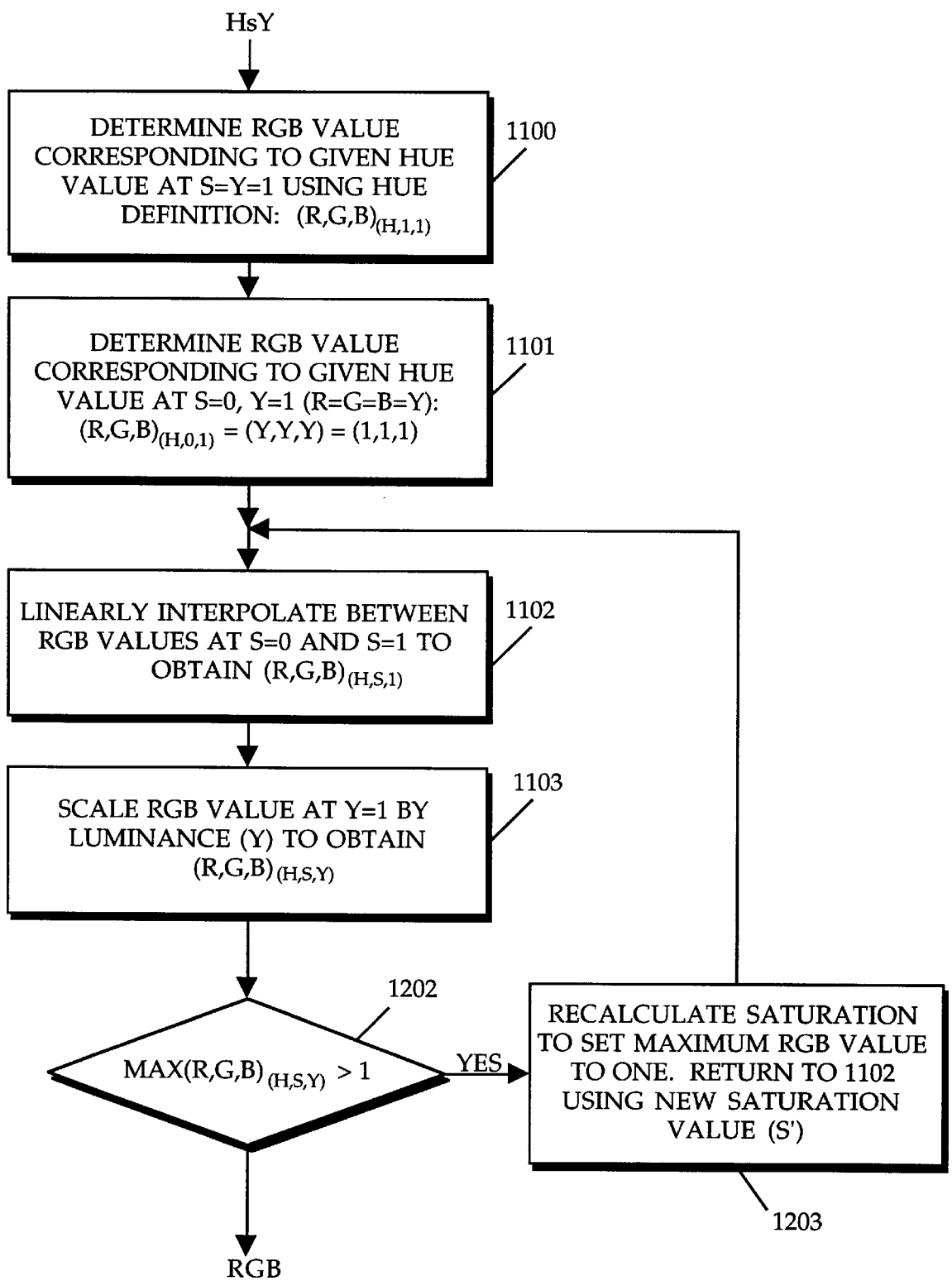
FIG. 12B is a flow diagram of a HsY to RGB transformation for mapping an HSY color into the RGB unit cube.

FIG. 12B shows the transformation process for conversion from HsY to RGB. The transformation from HsY space into RGB space is identical to the standard HSY to RGB transformation through block 1103. The RGB value generated in block 1103 of FIG. 11 is passed to block 1202. In block 1202, the maximum RGB component value is compared to one. If the maximum RGB component value is not greater than one, then the RGB value calculated in block 1103 is maintained. However, if the maximum RGB component value is larger than one, then, in block 1203, a normalized saturation value S' is calculated per equation [52] above. Using the normalized saturation value, the process returns to block 1102 to recalculate the RGB value.

In practice, the extra steps needed for HsY conversion are combined into the steps of blocks 1100 through 1103 for coding efficiency.

The transformation routines are incorporated in a color editing or graphics editing program such as PHOTOSHOP, or a rendering program such as RENDERMAN, or other suitable software program. Manipulation of color values once the color value is transformed into HSY space may be performed through a user-interactive interface. Also, manipulation of color values may be internal to the software process wherein the hue, saturation and luminance values are altered by the graphics application in a manner transparent to the user, such as in a shading process. One example of a software program implementing HSY transformations is the UNIX tool called "hsytool." "Hsytool" provides a user-interactive HSY/RGB color selection tool for Silicon Graphics, Inc. (SGI) workstations.

Figure 16:
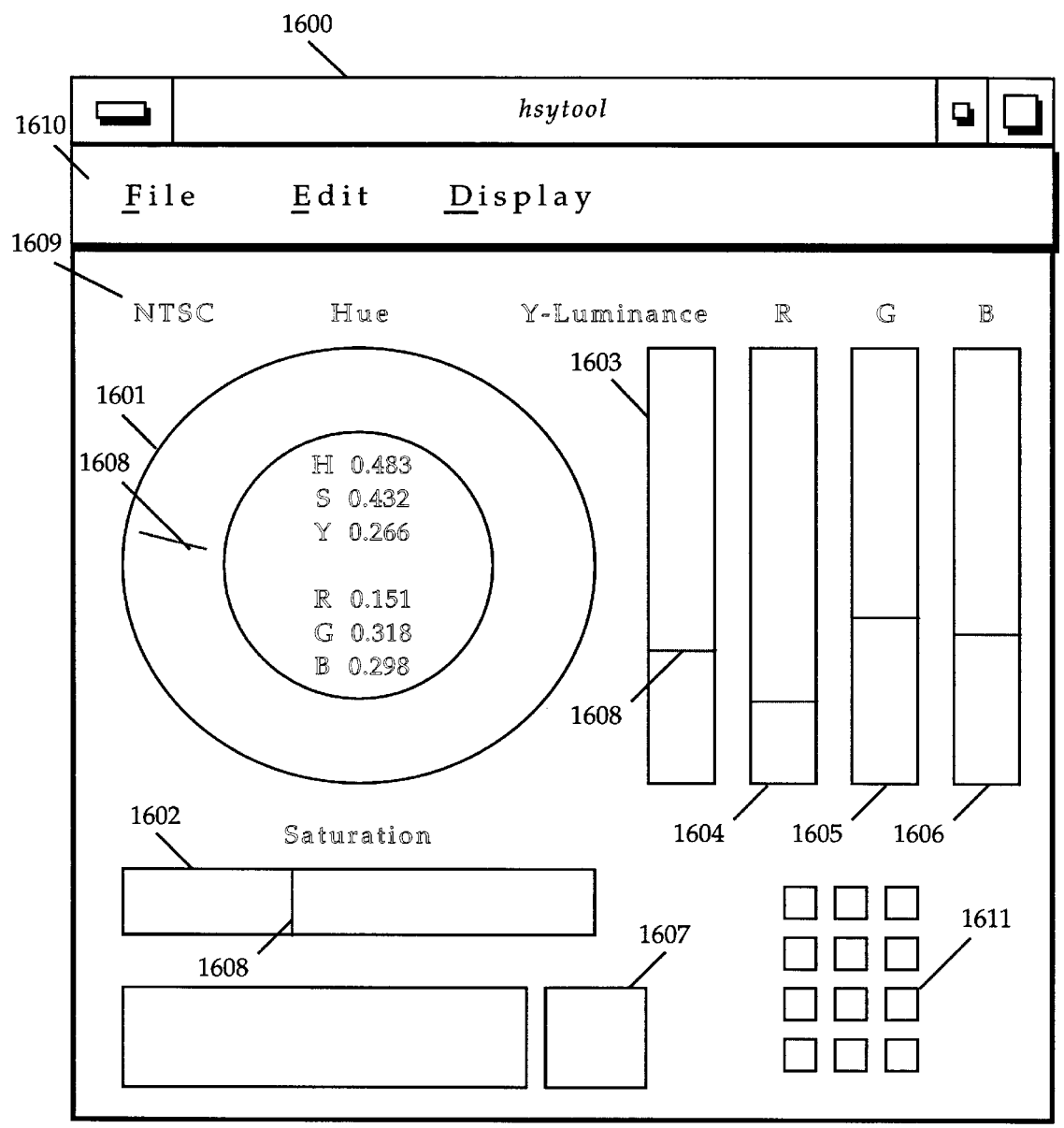
FIG. 16 is an illustration of a graphic user interface for editing and selecting color values.

"Hsytool" is an interactive graphical tool which allows for color selection using a "mouse." When the program is started, a window is "opened" (i.e., displayed) on the graphic display device as shown in FIG. 16. The window (1600) contains six controls, one each for hue (H), saturation (S) and luminance (Y) (the coordinates of HSY color space), and one each for red (R), green (G) and blue (B) (the coordinates for RGB color space).

Hue control 1601 is a circular dial, sometimes referred to as a hue wheel or color wheel. The color values depicted in the circular dial are those values obtainable by varying the hue parameter only (i.e., maintaining constant saturation and luminance) of the current color value. The display corresponds to the constant saturation and constant luminance circle about the luminance axis in HSY color space which contains the current color value.

Saturation control 1602 is a horizontal slider, meaning that it is a strip of constant hue and constant luminance color values varying from a saturation value of zero (gray tone) at one end to a saturation value of one at the opposite end of the strip. The strip corresponds to the constant hue and constant luminance line containing the current color value which originates at the central luminance axis and ends at the edge of the unity valued cylinder in HSY color space.

Luminance control 1603 is a vertical slider of constant hue and constant saturation color values varying from a luminance value of zero (black) at the bottom to a luminance value of one at the top of the strip. The strip corresponds to the constant hue and constant saturation line containing the current color value which originates at the bottom of the cylinder and extends parallel to the center axis to the top of the cylinder in HSY color space.

Red control 1604, green control 1605 and blue control 1606 are also vertical sliders. Each slider displays the color values obtainable by varying the respective RGB value from zero at the bottom of the strip to one at the top, while maintaining the remaining RGB parameters at constant values.

Color values in the hue wheel, saturation strip and luminance strip which correspond to RGB values outside of the unit RGB cube are indicated by a red color value. Alternatively, appropriate HSy or HsY color values may be shown.

At any given time, "hsytool" has a single current color which is displayed in square swatch 1607 in the lower left corner of window 1600. The HSY and RGB coordinates of the current color are shown numerically in the center of hue control (color wheel) 1601. These coordinates correspond to the current settings of the six controls (H, S, Y, R, G and B). Short line segments 1608 across each control in contrasting color are provided as control indicators for indicating the same coordinates in analog form. An indicator (1609) in the upper left corner of window 1600 indicates whether the current color value is "safe" for use in NTSC broadcast video (i.e., whether the color value is in the color space that NTSC video can reproduce).

A control setting is changed by either clicking the left mouse button while the mouse cursor is on the desired color value inside the control, or by "dragging" the control indicator with the left button held down beginning with the mouse cursor inside the control. If any one of the HSY coordinates are changed, all three RGB coordinates typically change. Similarly, if any one of the RGB coordinates are changed, all three HSY coordinates typically change.

Once the desired color value has been selected as the current color value, pressing the "Edit" button in menu bar 1610 will pull down a menu which allows for the current HSY or RGB coordinates to be "cut out." This places the color coordinates in the window system's cut buffer, allowing the color coordinates to be inserted or "pasted" in a shell window by clicking on the middle mouse button in the shell window. A user can edit a model, shader, C program or other text file and insert a color value selected with "hsytool." The inverse operation is also possible. Color coordinates can be cut out from a model, shader, C program or other text file and "pasted" into "hsytool" using one of the commands in the "Edit" menu.

In "hsytool," colors displayed outside of window 1600 (elsewhere on the screen) are selected by placing the mouse cursor in window 1600, but not in one of the color controls. Then, the left mouse button is depressed while the mouse cursor is moved outside of window 1600 to the location of the pixel containing the desired color value. When the left mouse button is released, "hsytool" reads the color value for the selected pixel and sets all of the HSY and RGB coordinates to reflect the new current color.

In window 1600 of FIG. 16, twelve small colored squares (1611), called "palette squares", are displayed beside the current color swatch 1607. Initially, these squares are black. Each square can save and restore a particular color value. To save the current color by storing it in a palette square, the middle mouse button is clicked while the mouse cursor is above a palette square. The selected palette square is then filled with the current color. To set the current color to the color of a palette square, the left mouse button is clicked while the mouse cursor is above the chosen palette square.

Figure 17:
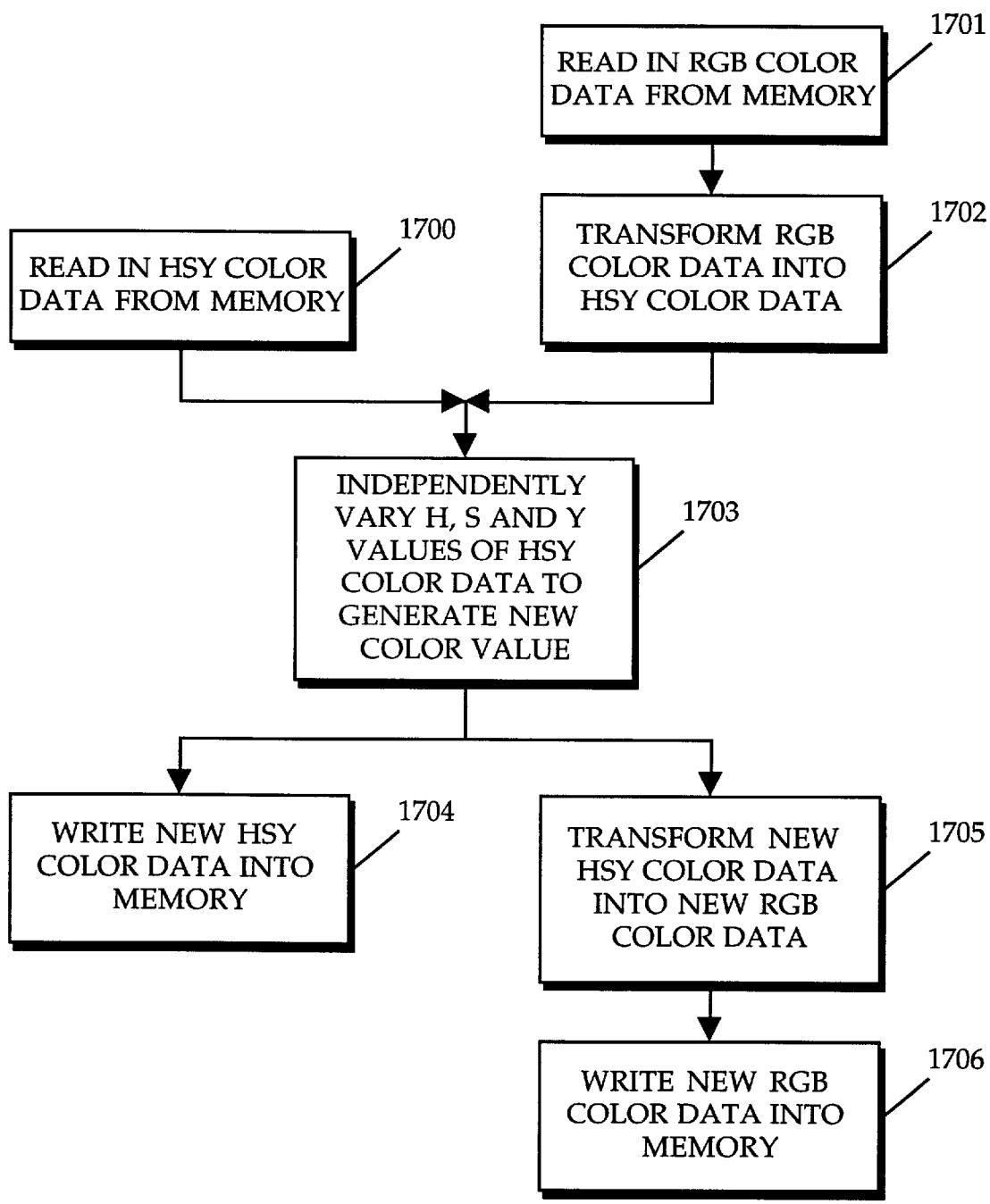
FIG. 17 is a flow diagram of a process for manipulating color values using HSY color data.

FIG. 17 is a flow diagram of the color manipulation process provided by graphic rendering, color image editing, and color picking/editing programs such as "hsytool." FIG. 17 illustrates a process for manipulating a color value initially provided as either HSY color data or as color data in a non-HSY format such as RGB. The resulting color value thus generated can then be stored in the computer system memory as color data in either HSY or non-HSY format. The color data can originate from or be placed into models, shaders, image files, text files or other graphics files (collectively referred to herein as "image scenes") in mass storage or main memory. The color data can also be generated from or placed into an active palette as in "hsytool." Use of a cut buffer or similar means to "cut" and "paste" color data between files and open applications has also been described with respect to "hsytool."

Blocks 1700 and 1701 represent color data input blocks for HSY color data and non-HSY color data, respectively. In block 1700, HSY color data representing a first color value is read from the computer system memory and stored in the color manipulation program's active memory. Block 1700 then leads to block 1703. In block 1701, RGB or other non-HSY color data is read from the computer system memory into the color manipulation program's active memory in main memory (i.e., RAM) for processing. In subsequent block 1702, the RGB data is transformed using the RGB-to-HSY transformation routine or the equivalent non-HSY-to-HSY routine to provide corresponding HSY color data that is stored in the program's active memory. Block 1702 leads to block 1703.

In block 1703, a graphic artist may interact with the color manipulation program, using independent controls such as provided in "hsytool," to alter the hue, saturation and luminance values as desired. User input in the form of keyboard keystrokes or mouse interaction are translated into changes in the respective stored hue, saturation and luminance data in the program's active memory. Alternatively, the color manipulation program may perform manipulation of the color data in a manner transparent to the user, such as by modifying luminance of color values associated with a textured model in accordance with a shading routine.

The new HSY color data from block 1703 is then stored in memory as shown in block 1704, or processed by an HSY-to-RGB transformation routine (or equivalent HsY and HSy routines) to generate new RGB or other non-HSY color data, as shown in block 1705. From block 1705, the process progresses to block 1706 wherein the new RGB color data is placed in memory. Writing the new color data to memory may consist of writing the new color data over the original color data, or of writing the new color data to a new location in memory, such as in a new image file. Color data in display format may be written to video memory for display, such as on a CRT.

Color selection and color alteration, such as provided by "hsytool," are two very important uses of the HSY color space. Because luminance is preserved, the hue and saturation of an image can be altered as desired without affecting the overall brightness of the image. This is useful for graphic art and computer generated imagery.

In graphic art, an RGB image to be used in a piece of artwork is transformed into the HSY color space and the hue is altered to suit the color palette of the artwork or the art director. Saturation can also be altered to "punch up" or "tone down" the color density. Luminance can be altered to brighten or darken the artwork.

In computer generated imagery or rendering, the same operations can be performed on texture maps that are applied to the surfaces of three dimensional objects. For more flexibility, the shader code used to apply a texture map to a three dimensional object can incorporate the HSY color space transformations—shifting and scaling hue, saturation and luminance—as controlled by a set of parameters set by the lighting or shading directors to change the color, "punch up" or "tone down" the color, or alter the brightness of the texture mapped object without any interaction between these adjustments. The independent nature of the color adjustments provided by the HSY color space greatly reduces the time required to perform these kinds of color alterations.

An example of C-language computer code routines for performing HSY/RGB transformations is included as "hsyxfrms.c" in Appendix 1.

An example of C-language computer code for implementing color value manipulation in HSY space as described for "hsytool" is provided as "hsytool.c" in Appendix 2.

Thus, a method and apparatus for manipulating color values in a computer graphics system has been described.

APPENDIX 1 hsy_xfrms.c

```
/*-------------------------------------------------------------
 *
 * Luminance definition constants:
 *
 *     Y = kR*R + kG*G + kB*B
 *
 * For NTSC as defined in ITU Recommendation BT.601
 *     kR = .298939
 *     kG = .586625
 *     kB = .114436
 *
 * For HDTV as defined in ITU Recommendation BT.709
 *     kR = .212671
 *     kG = .715160
 *     kB = .072169
 *
 *-------------------------------------------------------------
 */
#define kR   .298939
#define kG   .586625
#define kB   114436

/*
 *-------------------------------------------------------------
 *
 * MIX - Linearly interpolates a and b based on x.
 *
 *-------------------------------------------------------------
 */
#define MIX(a,b,x)       (((b)-(a))*(x)+(a))

/*
 *-------------------------------------------------------------
 *
 * getHueSection -
 *
 *     Determines which section of the hue wheel an RGB color occupies as
 *     well as the values of the minimum and maximum RGB components.
 *
```

```
 *  Input:
 *      RGB[3] - the RGB color: RGB[0]=Red, RGB[1]=Green, RGB[2]=Blue
 *
 *  Output:
 *      section - the section of the hue wheel numbered 0 through 5.
 *      min     - the value of the minimum RGB component.
 *      max     - the value of the maximum RGB component.
 *
 *-----------------------------------------------------------------------------
 */
void getHueSection (
        float   RGB[],
        int     *section,
        float   *min,
        float   *max
) {
        *max = (RGB[0] > RGB[1]) ? RGB[0] : RGB[1];
        if (RGB[2] > *max) *max = RGB[2];

*min = (RGB[0] < RGB[1]) ? RGB[0] : RGB[1];
        if (RGB[2] < *min) *min = RGB[2];

if (*max == RGB[0])
                *section = (*min == RGB[1]) ? 5 : 0;
        else if (*max == RGB[1])
                *section = (*min == RGB[2]) ? 1 : 2;
        else if (*max == RGB[2])
                *section = (*min == RGB[0]) ? 3 : 4;
}
/*
 *-----------------------------------------------------------------------------
 *
 *  RGB_to_HSY -
 *
 *      Converts an RGB color to the HSY color space.
 *
 *  Input:
 *      RGB[3] - the RGB color: RGB[0]=Red, RGB[1]=Green, RGB[2]=Blue
 *
 *  Output:
 *      HSY[3] - the HSY color:  HSY[0]=Hue, HSY[1]=Saturation,
 *                               HSY[2]=Luminance
```

```
       *
       *-------------------------------------------------------------------------
       */
       void RGB_to_HSY (
5            float    RGB[],
             float    HSY[]
       ) {
             int     section;
             float   min, max, hue, x;
10
             HSY[2] = kR*RGB[0] + kG*RGB[1] + kB*RGB[2];
             if (HSY[2] < .00001) return;

getHueSection (RGB, &section, &min, &max);
15
             HSY[1] = 1. - min/HSY[2];
             if (HSY[1] < .00001) return;

x = (max-HSY[2])/(HSY[1]*HSY[2]);
20           switch (section) {
                case 0: hue = ((1. - 1./kR) - x)       / (1./kR - 1./(kR + kG));      break;
                case 1: hue = (x - (1. - 1./(kR + kG))) / (1./kG - 1./(kR + kG)) + 1; break;
                case 2: hue = ((1. - 1./kG) - x)       / (1./kG - 1./(kG + kB)) + 2; break;
                case 3: hue = (x - (1. - 1./(kG + kB))) / (1./kB - 1./(kG + kB)) + 3; break;
25              case 4: hue = ((1. - 1./kB) - x)       / (1./kB - 1./(kB + kR)) + 4; break;
                case 5: hue = (x - (1. - 1./(kB + kR))) / (1./kR - 1./(kB + kR)) + 5; break;
             }
             HSY[0] = hue*(1./6.);
       }
30
       /*
       *-------------------------------------------------------------------------
       *
       * HSY_to_RGB -
35     *
       *     Converts an HSY color to the RGB color space.
       *
       * Input:
       *     HSY[3] - the HSY color:  HSY[0]=HUE, HSY[1]=Saturation,
40     *                              HSY[2]=Luminance
       *
       * Output:
       *     RGB[3] - the RGB color:  RGB[0]=Red, RGB[1]=Green, RGB[2]=Blue
```

```
         *
         *------------------------------------------------------------------------------
         */
         void HSY_to_RGB  (
5                float   HSY[],
                 float   RGB[]
         ) {
                 float   hue, f;
                 int     section;
10
                 hue = 6.0*fmod (HSY[0], 1.0);

section = (int) floor (hue);
                 f = hue - section;
15
                 switch (section) {
                 case 0:
                         RGB[0] = MIX (1./kR, 1./(kR + kG), f);
                         RGB[1] = MIX (0., 1./(kR + kG), f);
20                       RGB[2] = 0.;
                         break;

case 1:
                         RGB[0] = MIX (1./(kR + kG), 0., f);
25                       RGB[1] = MIX (1./(kR + kG), 1./kG, f);
                         RGB[2] = 0.;
                         break;

case 2:
30                       RGB[0] = 0.;
                         RGB[1] = MIX (1./kG, 1./(kG + kB), f);
                         RGB[2] = MIX (0., 1./(kG + kB), f);
                         break;

35               case 3:
                         RGB[0] = 0.;
                         RGB[1] = MIX (1./(kG + kB), 0., f);
                         RGB[2] = MIX (1./(kG + kB), 1./kB, f);
                         break;
40               case 4:
                         RGB[0] = MIX (0., 1./(kB + kR), f);
                         RGB[1] = 0.;
```

```
                    RGB[2] = MIX (1./kB, 1./(kB + kR), f);
                    break;

case 5:
                    RGB[0] = MIX (1./(kB + kR), 1./kR, f);
                    RGB[1] = 0.;
                    RGB[2] = MIX (1./(kB + kR), 0., f);
                    break;
            }
            RGB[0] = HSY[2]*MIX (1.0, RGB[0], HSY[1]);
            RGB[1] = HSY[2]*MIX (1.0, RGB[1], HSY[1]);
            RGB[2] = HSY[2]*MIX (1.0, RGB[2], HSY[1]);
    }
    /*
    *-------------------------------------------------------------------------------
    *
    * HsY_to_RGB -
    *
    *     Converts an HSY color to the RGB color space.  Saturation is
    *     normalized to the unit RGB cube.
    *
    * Input:
    *     HSY[3] - the HSY color:  HSY[0]=Hue, HSY[1]=Saturation,
    *                              HSY[2]=Luminance
    *
    * Output:
    *     RGB[3] - the RGB color: RGB[0]=Red, RGB[1]=Green, RGB[2]=Blue
    *
    *-------------------------------------------------------------------------------
    */
    void HsY_to_RGB (
            float  HSY[],
            float  RGB[]
    ) {
            float  hue, f, sat, lum;
            int    section;
            float  m, k;

hue = 6.0*fmod (HSY[0], 1.0);
            sat = HSY[1];
            lum = HSY[2];
```

```
              section = (int) floor (hue);
              f = hue - section;

5             switch (section) {
              case 0:
                      RGB[0] = lum * MIX (1./kR, 1./(kR + kG), f);
                      RGB[1] = lum * MIX (0., 1./(kR + kG), f);
                      RGB[2] = 0.;
10
                      m = RGB[0] - lum;
                      k = MIX (lum, RGB[0], sat);
                      break;

15            case 1:
                      RGB[0] = lum * MIX (1./(kR + kG), 0., f);
                      RGB[1] = lum * MIX (1./(kR + kG), 1./kG, f);
                      RGB[2] = 0.;

20                    m = RGB[1] - lum;
                      k = MIX (lum, RGB[1], sat);
                      break;

case 2:
25                    RGB[0] = 0.;
                      RGB[1] = lum * MIX (1./kG, 1./(kG + kB), f);
                      RGB[2] = lum * MIX (0., 1./(kG + kB), f);

m = RGB[1] - lum;
30                    k = MIX (lum, RGB[1], sat);
                      break;

case 3:
                      RGB[0] = 0.;
35                    RGB[1] = lum * MIX (1./(kG + kB), 0., f);
                      RGB[2] = lum * MIX (1./(kG + kB), 1./kB, f);

m = RGB[2] - lum;
                      k = MIX (lum, RGB[2], sat);
40                    break;

case 4:
                      RGB[0] = lum * MIX (0., 1./(kB + kR), f);
```

```
                RGB[1] = 0.;
                RGB[2] = lum * MIX (1./kB, 1./(kB + kR), f);

m = RGB[2] - lum;
 5              k = MIX (lum, RGB[2], sat);
                break;

case 5:
                RGB[0] = lum * MIX (1./(kB + kR), 1./kR, f);
10              RGB[1] = 0.;
                RGB[2] = lum * MIX (1./(kB + kR), 0., f);

m = RGB[0] - lum;
                k = MIX (lum, RGB[0], sat);
15      }
        if (k > 1.0) sat = (1.0 - lum) / m;

RGB[0] = MIX (lum, RGB[0], sat);
        RGB[1] = MIX (lum, RGB[1], sat);
20      RGB[2] = MIX (lum, RGB[2], sat);
   }

/*
   *------------------------------------------------------------------
25 *
   * HSy_to_RGB -
   *
   *    Converts an HSY color to the RGB color space.  Luminance is
   *    normalized to the unit RGB cube.
30 *
   * Input:
   *    HSY[3] - the HSY color:  HSY[0]=Hue, HSY[1]=Saturation,
   *                             HSY[2]=Luminance
   *
35 * Output:
   *    RGB[3] - the RGB color:  RGB[0]=Red, RGB[1]=Green, RGB[2]=Blue
   *
   *------------------------------------------------------------------
   */
40 void HSy_to_RGB (
        float   HSY[],
        float   RGB[]
   ) {
```

```
        float  max;

HSY_to_RGB (HSY, RGB);

5       max = (RGB[0] > RGB[1]) ? RGB[0] : RGB[1];
        if (RGB[2] > max)  max = RGB[2];

if (max > 1.0) {
                RGB[0] /= max;
10              RGB[1] /= max;
                RGB[2] /= max;
        }
    }
```

APPENDIX 2 hsytool.c

```
static char sccsid[] = "%W% (Pixar) %G%";

/*
 * This is now a mixed mode X/Motif and GL program for Irix version 4.
 *
 * Display a color wheel for hue and two bars for saturation and luminance.
 * Mouse used to point at a particular color. The control which is pointed
 * at constrains the other two controls.
 *
 * To do:
 *     Add a "Color Space" menu to select which color space to use: HSY,
 *     HsY, or HSy.
 *
 * Copyright (c) 1995, Pixar
 *
 */ include <stdio.h>
include <stdlib.h>
#include <string.h>
#include <math.h>
#include <X11/Intrinsic.h>
#include <X11/StringDefs.h>
#include <X11/Xatom.h>
#include <Xm/Frame.h>
#include <Xm/MainW.h>
#include <Xm/MessageB.h>
#include <X11/Xirisw/GlxMDraw.h>
#include <gl/gl.h>
#include <pwd.h>
#include <limits.h>
include </usr/anim/rman/include/tiffio.h> ifndef PI
define PI      3.1415926535897932384626434
#endif
#define TWOPI   (2.0 * PI)
```

```
     #define HOWHIGH           380
     #define HOWWIDE           410

String fallback_resources[] = {
 5        "*geometry: =415x420",
          "*frame*shadowType: SHADOW_IN",
          NULL
     };

10   /*
      * Global data structures.
      */ static short   color_background[3]     = { 132, 132, 132 };
15   static short   color_indicator[3]      = { 200, 255, 55 };
     static short   color_text[3]           = { 0, 255, 200 };
     static short   color_outofrange[3]     = { 255, 0, 0 };
     int balls = 1;

20   float   hsytriple[3]  = { 0.0, .407, .240 };
     float   rgbtriple[3]  = { .469, .142, .142 };
     float   lightcolor[3] = { 1.0, 1.0, 1.0 };
     float   KsKdKa[3]     = { 0.5, 0.5, .05 };
     #define        Ks KsKdKa[0]
25   #define        Kd KsKdKa[1]
     #define        Ka KsKdKa[2]
     #define        lt_red lightcolor[0]
     #define        lt_grn lightcolor[1]
     #define        lt_blu lightcolor[2]
30   #define        hsy_hue   hsytriple[0]
     #define        hsy_sat   hsytriple[1]
     #define        hsy_lum   hsytriple[2]
     #define        rgb_red   rgbtriple[0]
     #define        rgb_grn   rgbtriple[1]
35   #define        rgb_blu rgbtriple[2]

char cut_buffer[100];
     #define LPIC_SZ 64
     #define LPIC_NC 4
40   #include "ballpic.h"
     #define PICNAME "/usr/local/lib/hsytool.ball.tif"
     get_little_pic(char *filename) {
            TIFF *tif;
```

```
            int width;
            int height;
            unsigned short channels;
            unsigned short bits;
 5          int i, j;

if ((tif = TIFFOpen(filename, "r")) == NULL) {
                    perror(filename);
                    return;
10          }

TIFFReadDirectory(tif);
            TIFFGetField(tif, TIFFTAG_IMAGEWIDTH, &width);
            TIFFGetField(tif, TIFFTAG_IMAGELENGTH, &height);
15          TIFFGetField(tif, TIFFTAG_SAMPLESPERPIXEL, &channels);
            TIFFGetField(tif, TIFFTAG_BITSPERSAMPLE, &bits);
            if (width != LPIC_SZ || height != LPIC_SZ || channels != LPIC_NC ||
                bits != 8) {
                    fprintf(stderr, "%s: not size %d x %d x %d x %d bits.\n",
20                  LPIC_SZ, LPIC_SZ, LPIC_NC, 8);
                    exit(1);
            }
            for (i = 0; i < LPIC_SZ; i++)
                    TIFFReadScanline(tif, littlepic[LPIC_SZ-1-i], i, 0);
25          TIFFClose(tif);
    }

/*
     * Function prototypes in the order in which the function definitions
30   * appear below.
     */ extern void  main(int, char **);
    static struct mycontrol *which_control(int x, int y);
35  static void  RedrawWindow(int);
    static void  CutColor(char *, char *);
    static void  PasteColor(int hsyflag, char *);
    static void  hsy_to_rgb(float *, float *);
    static void  rgb_to_hsy(float *, float *);
40  static void  about_hsytool();
    static int   isInRect();
    static void  pickColorFromScreen(int x, int y);
```

```
       /* forward declarations of callbacks */
       static void exposeCB(Widget, XtPointer, XtPointer);
       static void resizeCB(Widget, XtPointer, XtPointer);
       static void initCB(Widget, XtPointer, XtPointer);
  5    static void inputCB(Widget, XtPointer, XtPointer);
       static void fileMenuCB(Widget, XtPointer, XtPointer);
       static void editMenuCB(Widget, XtPointer, XtPointer);

static Widget makeMyMenus(Widget w);
 10    static void cut_selection(Widget w, Time t);
       static void paste_selection(Widget w, XEvent *paste_event, int);

/* .hsytoolrc management - fwd decl. */
       static void readhsytoolrc(void);
 15    static void writehsytoolrc(void);
       static void save_for_undo(void);
       static void init_undo(void);
       static void undo(void);
       static void setBGcolor(void);
 20    static void setballsmode(void);
       static void setlightcolor(void);
       static void setKsKdKa(void);
       static Widget mainw;

25    /* The GLX configuration parameter:
        *      RGB mode
        *      nothing else special
        */
       static GLXconfig glxConfig [] = {
 30         { GLX_NORMAL, GLX_RGB, TRUE },
            { 0, 0, 0 }
       };

Dimension glx_width, glx_height;
 35    Widget glx_widget;

#define WHEEL_KIND     0
       #define BAR_KIND       1
       #define PALETTE_KIND   2
 40
       struct mycontrol {
              unsigned    kind:4;
              unsigned    vertical:1;
```

```
            unsigned    rgb:1;
            unsigned    index:8;       /* meaning depends on kind */
            char        *label;
            int         xmin, xmax, ymin, ymax;
 5          int         indloc, indlen;
            int         labelx, labely;
            int         xtext, ytext;  /* loc of numerical display */
            void        (*update)();
            /* Only hue wheel uses the following stuff ... */
10          int         (*inside)();
            int         rmin, rmax;
            int         xctr, yctr;
            short       indv0[2], indv1[2];  /* endpts of last indicator */
    };
15
    struct palette_square {
            float       rgb[3];
    };

20  static void setup_controls(void);

void
    main(int argc, char **argv)
    {
25          XtAppContext app_context;
            Arg args[20];
            int n = 0;
            Widget toplevel, frame, menubar;
            int i;
30          char *littlepicname = 0;
            char *envname;

init_undo();             /* fill up with defaults */
            readhsytoolrc();
35          save_for_undo();
            setup_controls();
            if (envname = getenv("HSYTOOL_PIC"))
                    littlepicname = envname;
            for (i = 1; i < argc; i++) {
40                  if (!strcmp(argv[i], "-pic")) {
                            littlepicname = argv[i+1];
                            break;
                    }
```

```
            }
            if (littlepicname)
                    get_little_pic(littlepicname);

5           toplevel = XtAppInitialize(&app_context, "animTool",
                            (XrmOptionDescList)NULL , 0,
                            (int*)&argc,
                            (String*)argv,
                            fallback_resources,
10                          (ArgList)NULL, 0);

n = 0;
            mainw = XtCreateManagedWidget("mainw",
                            xmMainWindowWidgetClass,
15                          toplevel, args, n);

menubar = makeMyMenus(mainw);
            XtVaSetValues(mainw, XmNmenuBar, menubar, NULL);

20          n = 0;
            frame = XtCreateManagedWidget("frame",
                            xmFrameWidgetClass,
                            mainw, args, n);
            n = 0;
25          XtSetArg(args[n], GlxNglxConfig, glxConfig); n++;
            glx_widget = XtCreateManagedWidget("glwidget",
                            glxMDrawWidgetClass,
                            frame, args, n);

30          XtAddCallback(glx_widget, GlxNginitCallback, initCB, 0);
            XtAddCallback(glx_widget, GlxNexposeCallback, exposeCB, 0);
            XtAddCallback(glx_widget, GlxNresizeCallback, resizeCB, 0);
            XtAddCallback(glx_widget, GlxNinputCallback, inputCB, 0);

35          XtRealizeWidget(toplevel);

XtAppMainLoop(app_context);
    }

40  /* Callbacks */

/* Called to redraw window. */
    static void
```

```
        exposeCB(Widget w,XtPointer client_data, XtPointer call_data)
        {
                static int index = 1;

5               GLXwinset(XtDisplay(w), XtWindow(w));
                reshapeviewport();          /* Is this needed on felix? */
                RedrawWindow(1);
        }

10      /* Called to resize window. exposeCB is called after to redraw. */
        static void
        resizeCB(Widget w, XtPointer client_data,XtPointer call_data)
        {
                GLXwinset(XtDisplay(w), XtWindow(w));
15              viewport(0, (Screencoord) ((GlxDrawCallbackStruct *)call_data)-
        >width-1,
                        0, (Screencoord) ((GlxDrawCallbackStruct *)call_data)->height-1);
                XtVaGetValues(glx_widget,
                        XmNwidth, &glx_width, XmNheight, &glx_height, NULL);
20
                /* Make one GL drawing unit == 1 pixel. */
                ortho2(0.0, (double) glx_width, 0.0, (double) glx_height);
        }

25      /*
         * Called when window is created, but before it is realized.
         * exposeCB is called later to draw it.
         */
        static void
30      initCB(Widget w,XtPointer client_data,XtPointer call_data)
        {
                GLXwinset(XtDisplay(w), XtWindow(w));
                RGBmode();
35
                XtVaGetValues(glx_widget,
                        XmNwidth, &glx_width, XmNheight, &glx_height, NULL);

/* Make one GL drawing unit == 1 pixel. */
40              ortho2(0.0, (double) glx_width, 0.0, (double) glx_height);
        }

/*
```

```
 * Input callback routine is called for every key up/down, every
 * mouse button up/down, and for mouse motion while a mouse button is
 down.
 */
static void
inputCB(Widget w, XtPointer client_data, XtPointer call_data)
{
        static long xorigin, yorigin;
        XEvent *event = ((GlxDrawCallbackStruct *)call_data)->event;
        long x, y;
        int eventx = 0, eventy = 0;
        static struct mycontrol *left_button = NULL;
        static struct mycontrol *middle_button = NULL;

GLXwinset(XtDisplay(w), XtWindow(w));

getorigin(&xorigin, &yorigin);   /* for pick-color */ switch (event->type) {
        case ButtonPress:
                switch (event->xbutton.button) {
                case Button1:
                        x = event->xbutton.x;
                        y = glx_height-1 - event->xbutton.y;
                        left_button = which_control(x, y);
                        break;
                case Button2:
                        x = event->xbutton.x;
                        y = glx_height-1 - event->xbutton.y;
                        middle_button = which_control(x, y);
                        break;
                default:
                        return;      /* NO-OP */
                }
                break;

case ButtonRelease:
                switch (event->xbutton.button) {
                case Button1:
                        if (left_button == NULL) {
                                /*
                                 * If mouse button is released outside the
```

```
                            * window, we'll try to grab a color from
                            * the framebuffer.
                            */
                            x = event->xbutton.x;
 5                          y = glx_height-1 - event->xbutton.y;
                            if (!isInRect(x, y,
                                0, glx_width-1, 0, glx_height-1)) {
                                    pickColorFromScreen(x+xorigin,y+yorigin);
                                    RedrawWindow(0);
10                                  writehsytoolrc();
                                    save_for_undo();
                            }
                            return;
                        }
15                      left_button = NULL;
                        break;
                    case Button2:
                        middle_button = NULL;
                        break;
20                  default:
                        return;         /* NO-OP */
                    }
                    break;

25              case MotionNotify:
                    x = event->xmotion.x;
                    y = glx_height-1 - event->xbutton.y;
                    if (left_button == NULL && middle_button == NULL) {
                        if (!isInRect(x, y,
30                          0, glx_width-1, 0, glx_height-1)) {
                                pickColorFromScreen(x+xorigin, y+yorigin);
                                RedrawWindow(0);
                        }
                        return;         /* NO-OP */
35                  }
                    break;

default:
                    return;         /* NO-OP */
40              }
                /* Do control updates using position (x,y) */
                if (left_button) {
                    (*left_button->update)(left_button,x,y,0);
```

```
                RedrawWindow(0);
        } else if (middle_button) {
                (*middle_button->update)(middle_button,x,y,1);
                RedrawWindow(0);
        }
        if (event->type == ButtonRelease) {
                writehsytoolrc();
                save_for_undo();
        }
} static void
fileMenuCB(Widget menu_item, XtPointer iin, XtPointer icbs)
{
        int item_no = (int)iin;
        switch (item_no) {
        case 0:
                about_hsytool(mainw);
                break;
        case 1:
                exit(0);
                break;
        }
} static void
editMenuCB(Widget menu_item, XtPointer iin, XtPointer icbs)
{
        XmAnyCallbackStruct *cbs = ((XmAnyCallbackStruct *)icbs);
        int item_no = (int)iin;
        switch (item_no) {
        case 0:
                CutColor("[ ]", cut_buffer);
                cut_selection(mainw, cbs->event->xbutton.time);
                break;

case 1:
                CutColor("(,)", cut_buffer);
                cut_selection(mainw, cbs->event->xbutton.time);
                break;

case 2:
```

```
                    CutColor(NULL, cut_buffer);
                    cut_selection(mainw, cbs->event->xbutton.time);
                    break;
5           case 3:
                    CutColor("h(,)", cut_buffer);
                    cut_selection(mainw, cbs->event->xbutton.time);
                    break;

10          case 4:
                    paste_selection(mainw, cbs->event, 0);
                    break;

case 5:
15                  paste_selection(mainw, cbs->event, 1);
                    break;
            case 6:
                    undo();
                    writehsytoolrc();
20                  return;
            }
            writehsytoolrc();
            save_for_undo();
    }
25  static void
    dispMenuCB(Widget menu_item, XtPointer iin, XtPointer icbs)
    {
            XmAnyCallbackStruct *cbs = ((XmAnyCallbackStruct *)icbs);
            int item_no = (int)iin;
30          switch (item_no) {
            case 0:
                    setBGcolor();
                    break;
            case 1:
35                  setlightcolor();
                    break;
            case 2:
                    setballsmode();
                    break;
40          case 3:
                    setKsKdKa();
                    break;
            }
```

```
            writehsytoolrc();
            save_for_undo();
    }
 5  /*
     * Build menus
     */ static Widget
10  makeMyMenus(Widget w)
    {
            Widget menubar;
            XmString cut1str, cut2str, cut3str, cut4str, paste1str, paste2str;
            XmString aboutstr, quitstr, editstr, filestr;
15          XmString cut1_accel, cut2_accel, cut3_accel, cut4_accel;
            XmString paste1_accel, paste2_accel;
            XmString undostr, undo_accel;
            XmString setbgstr, setbg_accel;
            XmString setltstr, setlt_accel;
20          XmString setballs, setbl_accel;
            XmString dispstr;
            XmString rgb2Ks, setKs_accel;

filestr = XmStringCreateSimple("File");
25          dispstr = XmStringCreateSimple("Display");
            aboutstr = XmStringCreateSimple("About hsytool ...");
            quitstr = XmStringCreateSimple("Quit");
            editstr = XmStringCreateSimple("Edit");
            cut1str = XmStringCreateSimple("Cut [r g b]");
30          cut2str = XmStringCreateSimple("Cut (r,g,b)");
            cut3str = XmStringCreateSimple("Cut cpack");
            cut4str = XmStringCreateSimple("Cut (h,s,y)");
            paste1str = XmStringCreateSimple("Paste rgb");
            paste2str = XmStringCreateSimple("Paste hsy");
35          cut1_accel = XmStringCreateSimple("Ctrl+R");
            cut2_accel = XmStringCreateSimple("Ctrl+C");
            cut3_accel = XmStringCreateSimple("Ctrl+G");
            cut4_accel = XmStringCreateSimple("Ctrl+H");
            paste1_accel = XmStringCreateSimple("Ctrl+P");
40          paste2_accel = XmStringCreateSimple("Ctrl+V");
            undostr = XmStringCreateSimple("Undo");
            undo_accel = XmStringCreateSimple("Ctrl+Z");
```

```
        rgb2Ks = XmStringCreateSimple("rgb->Ks,Kd,Ka");
        setKs_accel = XmStringCreateSimple("Ctrl+K");
        setbgstr = XmStringCreateSimple("BG color");
        setbg_accel = XmStringCreateSimple("Ctrl+B");
        setltstr = XmStringCreateSimple("light color");
        setlt_accel = XmStringCreateSimple("Ctrl+L");
        setballs = XmStringCreateSimple("balls/swatches");
        setbl_accel = XmStringCreateSimple("Ctrl+S");

menubar = XmVaCreateSimpleMenuBar(w, "menubar",
            XmVaCASCADEBUTTON, filestr, 'F',
            XmVaCASCADEBUTTON, editstr, 'E',
            XmVaCASCADEBUTTON, dispstr, 'D',
            NULL);

XmVaCreateSimplePulldownMenu(menubar, "file_menu", 0,
            fileMenuCB,
            XmVaPUSHBUTTON, aboutstr, 'A', NULL, NULL,
            XmVaPUSHBUTTON, quitstr, 'Q', NULL, NULL,
            NULL);

XmVaCreateSimplePulldownMenu(menubar, "edit_menu", 1,
            editMenuCB,
            XmVaPUSHBUTTON, cut1str, NoSymbol, "Ctrl<Key>r", cut1_accel,
            XmVaPUSHBUTTON, cut2str, NoSymbol, "Ctrl<Key>c", cut2_accel,
            XmVaPUSHBUTTON, cut3str, NoSymbol, "Ctrl<Key>g", cut3_accel,
            XmVaPUSHBUTTON, cut4str, NoSymbol, "Ctrl<Key>h", cut4_accel,
            XmVaPUSHBUTTON, paste1str, NoSymbol, "Ctrl<Key>p", paste1_accel,
            XmVaPUSHBUTTON, paste2str, NoSymbol, "Ctrl<Key>v", paste2_accel,
            XmVaPUSHBUTTON, undostr, NoSymbol, "Ctrl<Key>z", undo_accel,
            NULL);

XmVaCreateSimplePulldownMenu(menubar, "disp_menu", 2,
            dispMenuCB,
```

```
                XmVaPUSHBUTTON, setbgstr, NoSymbol, "Ctrl<Key>b",
        setbg_accel,
                XmVaPUSHBUTTON, setltstr, NoSymbol, "Ctrl<Key>l",
        setlt_accel,
                XmVaPUSHBUTTON, setballs, NoSymbol, "Ctrl<Key>s",
        setbl_accel,
                XmVaPUSHBUTTON, rgb2Ks, NoSymbol, "Ctrl<Key>k",
        setKs_accel,
                NULL);

XmStringFree(filestr);
        XmStringFree(aboutstr);
        XmStringFree(quitstr);
        XmStringFree(editstr);
        XmStringFree(cut1str);
        XmStringFree(cut2str);
        XmStringFree(cut3str);
        XmStringFree(cut4str);
        XmStringFree(paste1str);
        XmStringFree(paste2str);
        XmStringFree(undostr);
        XmStringFree(setbgstr);
        XmStringFree(rgb2Ks);

XtManageChild(menubar);
        return menubar;
} static Boolean
cvtproc(Widget w, Atom *selection, Atom *target,
        Atom *type_return, XtPointer *value_return,
        unsigned long *length_return, int *format_return)
{
        char *data = cut_buffer;
        int len = strlen(data);

if (*target == XA_STRING) {
                *value_return = XtMalloc(len);
                strncpy(*value_return, data, len);
                *type_return = XA_STRING;
                *format_return = 8;
                *length_return = len;
        } else {
```

```
                    printf("Bad conversion.\n");
                    return False;
            }
    }
static void
loseproc(Widget w, Atom *selection)
{
}
static void
doneproc(Widget w, Atom *selection, Atom *target)
{
}
static void
cut_selection(Widget w, Time t)
{
        if (!XtOwnSelection(w, XA_PRIMARY, t, cvtproc, loseproc, doneproc))
                printf("Ooops.  Didn't get selection.\n");
} static int paste_type;      /* so callback pasteproc knows which menu
command */ static void
pasteproc(Widget w, XtPointer data, Atom *selection,
        Atom *datatype, XtPointer value, unsigned long *len,
        int *format)
{
        XEvent *event = (XEvent *) data;
        int copylen;

if (value != NULL && *len > 0) {
                copylen = sizeof(cut_buffer)-1;
                if (*len < copylen)
                        copylen = *len;
                strncpy(cut_buffer, (char *) value, copylen);
                cut_buffer[copylen] = '\0';
                XtFree(value);

PasteColor(paste_type, cut_buffer);
```

```
        } else
                cut_buffer[0] = '\0';
} static void
paste_selection(Widget w, XEvent *paste_event, int type)
{
        static XEvent event;

paste_type = type;
        event = *paste_event;     /* save it until needed. */
        XtGetSelectionValue(w, XA_PRIMARY, XA_STRING,
                pasteproc, (XtPointer) &event, paste_event->xbutton.time);
} static void
CutColor(char *punct, char *cbp)
{
        if (punct == NULL) {
                long c;
                c  = ((int)(rgb_red * 255.) & 0xFF);
                c |= ((int)(rgb_grn * 255.) & 0xFF) << 8;
                c |= ((int)(rgb_blu * 255.) & 0xFF) << 16;
                sprintf(cbp, "0x%X", c);
        } else if (*punct == 'h') {
                punct++;
                sprintf(cbp,
                        "%c%6.4f%c%6.4f%c%6.4f%c", punct[0], hsy_hue, punct[1],
                        hsy_sat, punct[1], hsy_lum, punct[2]);
        } else {
                sprintf(cbp,
                        "%c%6.4f%c%6.4f%c%6.4f%c", punct[0], rgb_red, punct[1],
                        rgb_grn, punct[1], rgb_blu, punct[2]);
        }
}

/*
 * Accept a new color by "pasting" from the selection. The pasted
 * color is parsed and used to set the RGB or HSY controls.
 */ static void
```

```
PasteColor(int hsyflag, char *buf)
{
        char    *bp;
        float   rd,gr,bl;

if ((bp = strchr(buf, '\n')) != NULL)
                *bp = '\0';

bp = buf;
        while (*bp == ' ' || *bp == '\t')   /* trim leading blanks */
                bp++;

if (bp[0] == '0' && (bp[1] == 'x' || bp[1] == 'X')) {
                /* assume cpack format -- one hex number */
                long c;

if (sscanf(bp, " 0x%X", &c) != 1) {
                        fprintf(stderr,
                                "hsytool: bad cpack hex number in cut buffer: \"%s\"\n",
                                bp);
                        ringbell();
                        return;
                } rd = (c & 0xFF) / 255.;
                gr = ((c>>8) & 0xFF) / 255.;
                bl = ((c>>16) & 0xFF) / 255.;
        } else {                /* a triple of 0:1 float values */
                char *cp;
                int pos = 0;
                bp += strspn(bp, "[ \t");
                cp = strtok(bp, ", \t");
                if (!cp) {
        format:
                        fprintf(stderr, "Invalid cut buffer format near entry %d\n", pos);
                        ringbell();
                        return;
                }
                pos++;
                rd = atof(cp);
                cp = strtok(NULL, ", \t");
                if (!cp) goto format;
```

```
                    pos++;
                    gr = atof(cp);
                    cp = strtok(NULL, "]), \t");
                    if (!cp) goto format;
 5                  bl = atof(cp);
            }
            if (hsyflag) {
                    hsy_hue = (rd < 0) ? 0 : ((rd > 1) ? 1 : rd);
                    hsy_sat = (gr < 0) ? 0 : ((gr > 1) ? 1 : gr);
10                  hsy_lum = (bl < 0) ? 0 : ((bl > 1) ? 1 : bl);
                    hsy_to_rgb(hsytriple, rgbtriple);
            } else {
                    rgb_red = (rd < 0) ? 0 : ((rd > 1) ? 1 : rd);
                    rgb_grn = (gr < 0) ? 0 : ((gr > 1) ? 1 : gr);
15                  rgb_blu = (bl < 0) ? 0 : ((bl > 1) ? 1 : bl);
                    rgb_to_hsy(rgbtriple, hsytriple);
            }
            RedrawWindow(1);
    }
20
    /*********************************************************************
    / ifdef      INDICATORS_BESIDE
25  /*
     * If INDICATORS_BESIDE is defined, the value indicators on the controls
     * are drawn beside the controls. Otherwise they are drawn directly on
     * top of the controls in a contrasting color.
     */
30  #define     INDMOVE         20
    #define INDMOVESAT  -15
    #define INDLEN          9
    #else
    #define INDMOVE         0
35  #define INDMOVESAT  0
    #define INDLEN          32
    #endif define SWATCHBALL_XMIN     210
40  #define SWATCHBALL_XMAX     273
    #define SWATCHBALL_YMIN     20
    #define SWATCHBALL_YMAX     83
    #define SWATCH_XMIN 20
```

```
#define SWATCH_YMIN    20
#define SWATCH_XMAX    205
define SWATCH_YMAX    83 define PALETTE_SQW    32      /* palette square width */
define PALETTE_SQH    32      /* palette square height */
#define PALETTE_SQBW   35      /* palette square width including border */
#define PALETTE_SQBH   35      /* palette square height including border */
#define PALETTE_NW     3       /* number of palette squares wide */
#define PALETTE_NH     4       /* number of palette squares high */
#define PALETTE_XMIN   284
#define PALETTE_XMAX   (PALETTE_XMIN+(PALETTE_NW-1)*PALETTE_SQBW+PALETTE_SQW-1)
#define PALETTE_YMIN   5
#define PALETTE_YMAX   (PALETTE_YMIN+(PALETTE_NH-1)*PALETTE_SQBH+PALETTE_SQH-1)

#define TEXTHEIGHT     15
define TEXTWIDTH      65 static struct palette_square palette_square[PALETTE_NW*PALETTE_NH];

static int     isInHueWheel();
static void    whereInHueWheel();
static void    updateHue();
static void    updateBar();
static void    updatePaletteSquare();

struct mycontrol huewheel = {
        WHEEL_KIND, 0, 0, 0, "Hue",
        20, 220, 160, 360,
        65+INDMOVE, INDLEN, 110, 365, 90, 295,
        updateHue,
        isInHueWheel, 60, 100, 120, 260
};
struct mycontrol satbar = {
        BAR_KIND, 0, 0, 1, "Saturation",
        20, 219, 105, 139,
        105+INDMOVESAT, INDLEN, 80, 150, 90, 280,
        updateBar,
};
```

```
       struct mycontrol valbar = {
               BAR_KIND, 1, 0, 2, "Y-Luminance",
               235, 269, 160, 360,
               235+INDMOVE, INDLEN, 185, 365, 90, 265,
 5             updateBar,
       };
       struct mycontrol redbar = {
               BAR_KIND, 1, 1, 0, "R",
               280, 314, 160, 360,
10             281+INDMOVE, INDLEN, 295, 365, 90, 245,
               updateBar,
       };
       struct mycontrol grnbar = {
               BAR_KIND, 1, 1, 1, "G",
15             325, 359, 160, 360,
               325+INDMOVE, INDLEN, 338, 365, 90, 230,
               updateBar,
       };
       struct mycontrol blubar = {
20             BAR_KIND, 1, 1, 2, "B",
               370, 404, 160, 360,
               371+INDMOVE, INDLEN, 380, 365, 90, 215,
               updateBar,
       };
25     struct mycontrol point_to_color;

define NPREDEFINED_CONTROLS 6 struct mycontrol
30     *controls[NPREDEFINED_CONTROLS+PALETTE_NW*PALETTE_NH+1] =
       {
               &huewheel, &satbar, &valbar, &redbar, &grnbar, &blubar
       };

35     static void RedrawControl(struct mycontrol *mcp, int);
       static void RedrawBar(struct mycontrol *mcp, int);
       static void RedrawHueWheel(struct mycontrol *mcp, int clearflag);
       static void RedrawPaletteSquare(struct mycontrol *mcp, int clearflag);
       static void whereInVertBar(int x, int y, int xmin, int xmax, int ymin, int
40     ymax,
                      float *valp);
       static int    isValidNTSC();
       static void   bar_indicator(int, int, int, int);
```

```
       static void    RedrawColorSwatch();
       static void    hsy_to_c3s(float *, short *);
       static void    rgb_to_c3s(float *, short *);
       static void    DrawValid();
5      static void    DrawInvalid();

static void
       RedrawWindow(int clearflag)
       {
10          struct mycontrol **mcpp;

if (clearflag) {
                    c3s(color_background);
                    clear();
15          } ifndef    INDICATORS_BESIDE
            rgb_to_c3s(rgbtriple, color_indicator);
            color_indicator[0] = 255 - color_indicator[0];
20          color_indicator[1] = 255 - color_indicator[1];
            color_indicator[2] = 255 - color_indicator[2];
       #endif for (mcpp = controls; *mcpp; mcpp++)
25                  RedrawControl(*mcpp, clearflag);

RedrawColorSwatch();

if (isValidNTSC(rgb_red, rgb_grn, rgb_blu))
30             DrawValid();
            else
               DrawInvalid();
       }

35     #define    control_value(mcp)      (mcp->rgb?rgbtriple:hsytriple)[mcp-
       >index]

static void
       RedrawControl(struct mycontrol *mcp, int clearflag)
40     {
            char b[20];
            short *label_color;
```

```
          switch (mcp->kind) {
          case BAR_KIND:
                  RedrawBar(mcp, clearflag);
                  break;
 5        case WHEEL_KIND:
                  RedrawHueWheel(mcp, clearflag);
                  break;
          case PALETTE_KIND:
                  RedrawPaletteSquare(mcp, clearflag);
10                return;      /* nothing more to draw */
          } if (clearflag) {
                  c3s(color_text);
15                cmov2i(mcp->labelx, mcp->labely);
                  charstr(mcp->label);
          }
          else {
                  c3s(color_background);
20                rectfi(mcp->xtext, mcp->ytext-2,
                          mcp->xtext+TEXTWIDTH-1, mcp->ytext+TEXTHEIGHT-
    3);
          }

25        if (control_value(mcp) > 1.0004)
                  label_color = color_outofrange;
          else
                  label_color = color_text;

30        c3s(label_color);
          sprintf(b, "%c %5.3f", mcp->label[0], control_value(mcp));
          cmov2i(mcp->xtext, mcp->ytext);
          charstr(b);
    }
35  drawball(int xmin, int ymin, int skip, float rgbv[3]) {
          short c[3];
          unsigned long parray[LPIC_SZ*LPIC_SZ];
          unsigned char *ip;
          unsigned long *op;
40        unsigned long *ep;
          int r, g, b, a;
          int i;
          float SpecR, SpecG, SpecB,
```

```
                    DifR, DifG, DifB;

op = &parray[0];
            ep = op + sizeof(parray) / sizeof *op;
5           ip = &littlepic[0][0][0];
            if (!balls) {
                    c3f(rgbv);
                    rectfi(xmin,ymin, xmin+LPIC_SZ/skip-1, ymin+LPIC_SZ/skip-1);
10                  return;
            }
            SpecR = lt_red*Ks;
            SpecG = lt_grn*Ks;
            SpecB = lt_blu*Ks;
15          DifR = lt_red*Kd;
            DifG = lt_grn*Kd;
            DifB = lt_blu*Kd;

while (op != ep) {
20                  for (i = 0; i < LPIC_SZ; i+=skip) {
                            r = ip[0]*SpecR+(ip[1]*DifR+ip[2]*Ka)*rgbv[0];
                            g = ip[0]*SpecG+(ip[1]*DifG+ip[2]*Ka)*rgbv[1];
                            b = ip[0]*SpecB+(ip[1]*DifB+ip[2]*Ka)*rgbv[2];
                            if (r > 255) r = 255;
25                          if (g > 255) g = 255;
                            if (b > 255) b = 255;
                            r = r + (1.-ip[3]/255.)*color_background[0];
                            g = g + (1.-ip[3]/255.)*color_background[1];
                            b = b + (1.-ip[3]/255.)*color_background[2];
30                          *op++ = (b<<16) | (g<<8) | r;
                            ip += 4*skip;
                    }
                    ip += LPIC_SZ*4*(skip-1);
            }
35          lrectwrite(xmin, ymin, xmin+LPIC_SZ/skip-1, ymin+LPIC_SZ/skip-1, parray);
    } static void
40  RedrawColorSwatch()
    {
            drawball(SWATCHBALL_XMIN, SWATCHBALL_YMIN, 1, rgbtriple);
            c3f(rgbtriple);
```

```
                rectfi(SWATCH_XMIN, SWATCH_YMIN, SWATCH_XMAX,
        SWATCH_YMAX);
        } static void
        updateHue(struct mycontrol *mcp, int x, int y, int midflag)
        {
                whereInHueWheel(mcp, x, y, &hsy_hue);
                hsy_to_rgb(hsytriple, rgbtriple);
        }

/*
         * Update any of the "bar" controls.
         */
        static void
        updateBar(struct mycontrol *mcp, int x, int y, int midflag)
        {
                float *triple = (mcp->rgb ? rgbtriple : hsytriple);

if (mcp->vertical) {
                        whereInVertBar(x, y,
                                mcp->xmin, mcp->xmax, mcp->ymin, mcp->ymax,
                                &triple[mcp->index]);
                } else {
                        whereInVertBar(y, x,
                                mcp->ymin, mcp->ymax, mcp->xmin, mcp->xmax,
                                &triple[mcp->index]);
                }
                if (mcp->rgb)
                        rgb_to_hsy(rgbtriple, hsytriple);
                else
                        hsy_to_rgb(hsytriple, rgbtriple);
        }

/*
         * Poking left button in square sets the current colors to the color of the
         * square. Poking middle button sets the square to the current colors.
         */
        static void
        updatePaletteSquare(struct mycontrol *mcp, int x, int y, int midflag)
        {
```

```
                float *rgb = palette_square[mcp->index].rgb;

if (midflag) {      /* Save current color in palette square. */
                        rgb[0] = rgbtriple[0];
 5                      rgb[1] = rgbtriple[1];
                        rgb[2] = rgbtriple[2];
                        RedrawPaletteSquare(mcp, 1);
                } else {            /* Set current color to palette square color. */
                        rgbtriple[0] = rgb[0];
10                      rgbtriple[1] = rgb[1];
                        rgbtriple[2] = rgb[2];
                        rgb_to_hsy(rgbtriple, hsytriple);
                }
        }
15
        static void
        pickColorFromScreen(int x, int y)
        {
                short red, green, blue;
20              unsigned long pixel;        /* to read RGB values from framebuffer */ if (readdisplay(x,y,x,y,&pixel, 0L) == 1) {
                        red = pixel & 0xFF;
                        green = (pixel >> 8) & 0xFF;
25                      blue = (pixel >> 16) & 0xFF;

rgb_red = red / 255.;
                        rgb_grn = green / 255.;
                        rgb_blu = blue / 255.;
30                      rgb_to_hsy(rgbtriple, hsytriple);
                }
        } static void
35      setup_controls(void)
        {
                int x, y, h, v;
                struct mycontrol **mcpp, *mcp;
                int index = 0;
40
                x = PALETTE_XMIN;
                mcpp = &controls[NPREDEFINED_CONTROLS];
                for (h = 0; h < PALETTE_NW; h++, x += PALETTE_SQBW) {
```

```
                y = PALETTE_YMIN;
                for (v = 0; v < PALETTE_NH; v++, y += PALETTE_SQBH) {
                        mcp = (struct mycontrol *)
                                malloc(sizeof(struct mycontrol));
                        if (mcp == NULL)
                                continue;
                        *mcpp++ = mcp;
                        mcp->kind = PALETTE_KIND;
                        mcp->index = index++;    /* which palette square? */
                        mcp->label = NULL;
                        mcp->xmin = x;
                        mcp->xmax = x + PALETTE_SQW - 1;
                        mcp->ymin = y;
                        mcp->ymax = y + PALETTE_SQH - 1;
                        mcp->inside = NULL;      /* it's just a rectangle */
                        mcp->update = updatePaletteSquare;
                }
        }
} static struct mycontrol *
which_control(int x, int y)
{
        struct mycontrol **mcpp, *mcp;

for (mcpp = controls; *mcpp != NULL; mcpp++) {
                mcp = *mcpp;
                if (isInRect(x, y, mcp->xmin, mcp->xmax, mcp->ymin, mcp->ymax))
                        if (mcp->inside == NULL || (*mcp->inside)(mcp, x, y))
                                return mcp;
        } if (!isInRect(x, y, 0, HOWWIDE-1, 0, HOWHIGH-1))
                return &point_to_color;
        return NULL;
} static int
isInHueWheel(struct mycontrol *mcp, int x, int y)
{
        float r, a;
```

```
                x -= mcp->xctr;
                y -= mcp->yctr;
                r = sqrt((double)(x*x + y*y));
                if (r < mcp->rmin || r > mcp->rmax)
 5                      return FALSE;
                return TRUE;
        } static int
10      isInRect(x, y, xmin, xmax, ymin, ymax)
                int x, y, xmin, xmax, ymin, ymax;
        { if (x < xmin || x > xmax || y < ymin || y > ymax)
15                      return FALSE;
                return TRUE;
        } static void
20      whereInHueWheel(struct mycontrol *mcp, int x, int y, float *huep)
        {
                float r, a;

x -= mcp->xctr;
25              y -= mcp->yctr;
                r = sqrt((double)(x*x + y*y));
                if (r < 0.5)
                        return;     /* don't change the hue */

30              a = atan2((double) y/r, (double) x/r);
                if (a < 0.) a += TWOPI;
                *huep = a/TWOPI;
        }

35      static void
        whereInVertBar(int x, int y, int xmin, int xmax, int ymin, int ymax,
                        float *valp)
        {

40              if (y < ymin)
                        *valp = 0;
                else if (y > ymax)
                        *valp = 1;
```

```
                else
                        *valp = (y - ymin)/(float)(ymax - ymin);
        }

5       #define NTSC_R   23
        #define NTSC_X   10
        #define NTSC_Y   (HOWHIGH - NTSC_X - NTSC_R)
        #define NTSC_W   3
        #define NTSC_THETA  45
10      static void
        DrawValid()
        {
            short       x, y;

15          x = NTSC_X + strwidth("NTSC")/2;
            y = NTSC_Y;
            c3s(color_background);
            circfs(x, y, (short)NTSC_R);
            c3s(color_text);
20          cmov2i(NTSC_X, NTSC_Y-getheight()/4); charstr("NTSC");
        } static void
        DrawInvalid()
25      {
            short       x, y;
            float       v0[2], v1[2], v2[2], v3[2];

x = NTSC_X + strwidth("NTSC")/2;
30          y = NTSC_Y;

v0[0] = x+NTSC_W/2.;
            v0[1] = y+NTSC_R-NTSC_W/2.;
            v1[0] = x-NTSC_W/2.;
35          v1[1] = y+NTSC_R-NTSC_W/2.;
            v2[0] = x-NTSC_W/2.;
            v2[1] = y-NTSC_R+NTSC_W/2.;
            v3[0] = x+NTSC_W/2.;
            v3[1] = y-NTSC_R+NTSC_W/2.;
40
            cpack(0x0000FF);  /* red */
            circfs(x, y, (short)NTSC_R);
            c3s(color_background);
```

```
        circfs(x, y, (short)NTSC_R-NTSC_W);
        c3s(color_text);
          cmov2i(NTSC_X, NTSC_Y-getheight()/4); charstr("NTSC");
        cpack(0x0000FF); /* red */
 5      pushmatrix();
        translate(x, y, 0);
         rotate(-NTSC_THETA*10, 'z');
        translate(-x, -y, 0);
        bgnpolygon();
10          v2f(v0);
            v2f(v1);
            v2f(v2);
            v2f(v3);
        endpolygon();
15      popmatrix();
    } define    IRE_TO_FLOAT(ire)    (((ire) - 7.5) / (100-7.5))
    static int
20  isValidNTSC(r, g, b)
    float   r, g, b;
    {
        float      Y, I, Q, sat;

25      /* NB: this is the composite matrix */
        Y = .299*r + .587*g + .114*b;
        I = .596*r - .274*g - .322*b;
        Q = .211*r - .523*g + .312*b;
        /* find the luminance vs. saturation excursion */
30      sat = sqrt(I*I + Q*Q);
        /* Limited to +100 to -16 IRE */
        return (Y+sat <= IRE_TO_FLOAT(100) && Y-sat > IRE_TO_FLOAT(-16));
    }

35  static void
    draw_indicator(struct mycontrol *mcp, int clearflag,
                int x0, int y0, int x1, int y1)
    {
    #ifdef INDICATORS_BESIDE
40      if (!clearflag) {     /* erase the old indicator line. */
                c3s(color_background);
                bgnline();
                v2s(mcp->indv0);
```

```
                    v2s(mcp->indv1);
                    endline();
            }
        #endif
 5
            c3s(color_indicator);
            bgnline();
            mcp->indv0[0] = x0;
            mcp->indv0[1] = y0;
10          v2s(mcp->indv0);
            mcp->indv1[0] = x1;
            mcp->indv1[1] = y1;
            v2s(mcp->indv1);
            endline();
15      } static void
        RedrawHueWheel(struct mycontrol *mcp, int clearflag)
        {
20      #define SLICES          160
        #define PIE_SLICE       (TWOPI/SLICES)
            static int done = 0;
            static float sin_tab[SLICES+1];
            static float cos_tab[SLICES+1];
25          int i;
            float hsy[3];
            float a, pa, sin_pa, cos_pa;
            short v0[2], v1[2];
            short c[3];
30
            hsy[1] = hsy_sat;
            hsy[2] = hsy_lum;

if (!done) {    /* compute table of sin and cos once */
35              done++;
                pa = -PIE_SLICE/2;
                for (i = 0; i <= SLICES; i++, pa += PIE_SLICE) {
                    sin_tab[i] = sin(pa);
                    cos_tab[i] = cos(pa);
40              }
            }

/* draw quadrilaterals to make up the wheel */
```

```
        pa = -PIE_SLICE/2;
        sin_pa = sin_tab[0]   /* sin(pa) */;
        cos_pa = cos_tab[0]   /* cos(pa) */;
        v0[0] = mcp->rmin * cos_pa + mcp->xctr;
 5      v0[1] = mcp->rmin * sin_pa + mcp->yctr;
        v1[0] = mcp->rmax * cos_pa + mcp->xctr;
        v1[1] = mcp->rmax * sin_pa + mcp->yctr;
        for (i = 1, a = 0.; i <= SLICES; i++, a += PIE_SLICE) {
                hsy[0] = a / TWOPI;
10              hsy_to_c3s(hsy, c);

c3s(c);
                bgnpolygon();
                v2s(v0);
15              v2s(v1);
                pa += PIE_SLICE;
                sin_pa = sin_tab[i]   /* sin(pa) */;
                cos_pa = cos_tab[i]   /* cos(pa) */;
                v0[0] = mcp->rmin * cos_pa + mcp->xctr;
20              v0[1] = mcp->rmin * sin_pa + mcp->yctr;
                v1[0] = mcp->rmax * cos_pa + mcp->xctr;
                v1[1] = mcp->rmax * sin_pa + mcp->yctr;
                v2s(v1);
                v2s(v0);
25              endpolygon();
        }

/* Draw indicator line. */
        {
30              float a, sin_a, cos_a;

a = hsy_hue * TWOPI;
                sin_a = sin(a);
                cos_a = cos(a);
35              draw_indicator(mcp, clearflag,
                        mcp->indloc * cos_a + mcp->xctr,
                        mcp->indloc * sin_a + mcp->yctr,
                        (mcp->indloc + mcp->indlen) * cos_a + mcp->xctr,
                        (mcp->indloc + mcp->indlen) * sin_a + mcp->yctr
40                      );
        }
}
```

```
static void
RedrawBar(struct mycontrol *mcp, int clearflag)
{
        float *triple = (mcp->rgb?rgbtriple:hsytriple);
        float val, valstep, vtriple[3];
        int row;
        short c[3];
        short v[2];
        int index = mcp->index;
        int ind;    /* indicator location */ vtriple[0] = triple[0]; vtriple[1] = triple[1]; vtriple[2] = triple[2];

val = 0;
        if (mcp->vertical) {
                valstep = 1./(mcp->ymax - mcp->ymin);
                for (row = mcp->ymin-1; row < mcp->ymax; row++,
     val+=valstep) {
                        vtriple[index] = val;
                        if (mcp->rgb)
                                rgb_to_c3s(vtriple, c);
                        else
                                hsy_to_c3s(vtriple, c);
                        c3s(c);
                        bgnpolygon();
                        v[1] = row;
                        v[0] = mcp->xmin;
                        v2s(v);
                        v[0] = mcp->xmax;
                        v2s(v);
                        v[1]++;
                        v2s(v);
                        v[0] = mcp->xmin;
                        v2s(v);
                        endpolygon();

}
                ind = mcp->ymin + triple[index]*(mcp->ymax - mcp->ymin);
                ind = ind > mcp->ymax ? mcp->ymax : ind;
                draw_indicator(mcp, clearflag,
                        mcp->indloc, ind, mcp->indloc+mcp->indlen, ind);
        } else {
                valstep = 1./(mcp->xmax - mcp->xmin);
```

```
                        val = 0;
                        for (row = mcp->xmin; row < mcp->xmax; row++, val +=
        valstep) {
                                vtriple[index] = val;
 5                              if (mcp->rgb)
                                        rgb_to_c3s(vtriple, c);
                                else
                                        hsy_to_c3s(vtriple, c);
                                c3s(c);
10                              bgnpolygon();
                                v[0] = row;
                                v[1] = mcp->ymin;
                                v2s(v);
                                v[1] = mcp->ymax;
15                              v2s(v);
                                v[0]++;
                                v2s(v);
                                v[1] = mcp->ymin;
                                v2s(v);
20                              endpolygon();
                        }
                        ind = mcp->xmin + triple[index]*(mcp->xmax - mcp->xmin);
                        ind = ind > mcp->xmax ? mcp->xmax : ind;
                        draw_indicator(mcp, clearflag,
25                              ind, mcp->indloc, ind, mcp->indloc+mcp->indlen);
                }
        }

/* Draw a square in the correct color. */
30      static void
        RedrawPaletteSquare(struct mycontrol *mcp, int clearflag)
        {
                short c[3];

35              if (!clearflag)        /* no reason for it to have changed */
                        return;
                drawball(mcp->xmin, mcp->ymin, 2, palette_square[mcp->index].rgb);
        }

40      /*********************************************************************
        **/ define C_HUE   0
```

```
        #define C_SAT    1
        #define C_LUM    2
        #define C_RED    0
        #define C_GRN    1
    5   #define C_BLU    2 static void
        rgb_to_c3s(float *rgb, short *c)
        {
   10           c[0] = rgb[0] * 255.;
                c[1] = rgb[1] * 255.;
                c[2] = rgb[2] * 255.;
        }
        static void
   15   hsy_to_c3s(float *hsy, short *cp)
        {
                float rgb[3];
                int red, grn, blu;

20           hsy_to_rgb(hsy, rgb);

red = 255 * rgb[C_RED];
                if (red < 0)     red = 0;
                if (red > 255)          red = 255;
   25           grn = 255 * rgb[C_GRN];
                if (grn < 0)     grn = 0;
                if (grn > 255)          grn = 255;
                blu = 255 * rgb[C_BLU];
                if (blu < 0)     blu = 0;
   30           if (blu > 255)          blu = 255;

cp[0] = red;
                cp[1] = grn;
                cp[2] = blu;
   35   } define    MIX(a,b,x)    (((b)-(a))*(x) + (a))

40   static void
        hsy_to_rgb(float *hsy, float *result)
        {
                float h, f;
```

```
          float s, y;
          int i;

h = hsy[C_HUE];
 5        if (h < 0)  h += 1;
          if (h >= 1) h -= 1;
          h *= 6;
          i = (int) floor(h);
          f = h - i;
10
          switch (i) {
          case 0:
                  result[C_RED] = MIX (3.34448, 1.12867, f);
                  result[C_GRN] = MIX (0, 1.12867, f);
15                result[C_BLU] = 0;
                  break;
          case 1:
                  result[C_RED] = MIX (1.12867, 0, f);
                  result[C_GRN] = MIX (1.12867, 1.70358, f);
20                result[C_BLU] = 0;
                  break;
          case 2:
                  result[C_RED] = 0;
                  result[C_GRN] = MIX (1.70358, 1.42653, f);
25                result[C_BLU] = MIX (0, 1.42653, f);
                  break;
          case 3:
                  result[C_RED] = 0;
                  result[C_GRN] = MIX (1.42653, 0, f);
30                result[C_BLU] = MIX (1.42653, 8.77193, f);
                  break;
          case 4:
                  result[C_RED] = MIX (0, 2.42131, f);
                  result[C_GRN] = 0;
35                result[C_BLU] = MIX (8.77193, 2.42131, f);
                  break;
          case 5:
                  result[C_RED] = MIX (2.42131, 3.34448, f);
                  result[C_GRN] = 0;
40                result[C_BLU] = MIX (2.42131, 0, f);
          } result[C_RED] = hsy[C_LUM]*MIX (1, result[C_RED], hsy[C_SAT]);
```

```
            result[C_GRN] = hsy[C_LUM]*MIX (1, result[C_GRN], hsy[C_SAT]);
            result[C_BLU] = hsy[C_LUM]*MIX (1, result[C_BLU], hsy[C_SAT]);
    } static void
    rgb_to_hsy(float *rgb, float *hsy)
    {
            enum {red, green, blue}  max, min;
            float  x;

/* luminance */
            hsy[2] = .299*rgb[0] + .587*rgb[1] + .114*rgb[2];

if (hsy[2] < 0.0001)          /* black */
                    return;

/* max and min rgb components */
            if (rgb[0]>=rgb[1] && rgb[0]>=rgb[2])
                    max = red;
            else if (rgb[1]>=rgb[0] && rgb[1]>=rgb[2])
                    max = green;
            else
                    max = blue;

if (rgb[0]<=rgb[1] && rgb[0]<=rgb[2])
                    min = red;
            else if (rgb[1]<=rgb[0] && rgb[1]<=rgb[2])
                    min = green;
            else
                    min = blue;

/* saturation */
            switch (min) {
            case red:
                    hsy[1] = 1. - rgb[0]/hsy[2];
                    break;
            case green:
                    hsy[1] = 1. - rgb[1]/hsy[2];
                    break;
            case blue:
                    hsy[1] = 1. - rgb[2]/hsy[2];
                    break;
            }
```

```
            if (hsy[1] < .0001)    /* grey */
                    return;

5           /* hue */
            switch (max) {
            case red:
                    x = (rgb[0]-hsy[2]) / (hsy[2]*hsy[1]);
                    if (min==green)
10                          hsy[0] = (x - 1.42131)*(1./.92317) + 5;
                    else
                            hsy[0] = (2.34448 - x)*(1./2.21581);
                    break;

15          case green:
                    x = (rgb[1]-hsy[2]) / (hsy[2]*hsy[1]);
                    if (min==blue)
                            hsy[0] = (x - .12867)*(1./.57491) + 1;
                    else
20                          hsy[0] = (.70358 - x)*(1./.27705) + 2;
                    break;

case blue:
                    x = (rgb[2]-hsy[2]) / (hsy[2]*hsy[1]);
25                  if (min==red)
                            hsy[0] = (x - .42653)*(1./7.3454) + 3;
                    else
                            hsy[0] = (7.77193 - x)*(1./6.35062) + 4;
                    break;
30          }
            hsy[0] *= (1./6.);
    }

/************************************************************************
35  ****/

/*
     * About box describing the current version of hsytool.
     */
40
    #define ABOUTHOWHIGH    200
    #define ABOUTHOWWIDE    360
```

```
       static void
       about_hsytool(Widget parent)
       {
               static Widget dialog;
 5             XmString text;
               char *buf = "hsytool 1.0 (Darwyn Peachey (all non-hsy space code),
       Mitch Prater, Pixar) 6 Sep 1995\n\nClick and drag on the hue wheel and
       bars\nto adjust color.  Each control shows\nthe colors obtainable by changing
       that\ncontrol.\n";
10
               if (dialog == NULL)
                       dialog = XmCreateInformationDialog(parent,"About
       hsytool",NULL,0);

15             text = XmStringCreateLtoR(buf, XmSTRING_DEFAULT_CHARSET);
               XtVaSetValues(dialog,
                       XmNmessageString, text,
                       NULL);

20             XmStringFree(text);
               XtManageChild(dialog);
       }

25     /* hsytoolrc management */
       static FILE *rcfiler, *rcfilew;

static char *
       GetHome(void)
30     {
               char *name;
               struct passwd *pwd;
               char *home;

35             home = getenv("HOME");
               if (home == 0 || *home == '\0') {
                       name = getlogin();
                       if (name == 0)
                               pwd = getpwuid(getuid());
40                     else
                               pwd = getpwnam(name);
                       if (pwd == 0)
                               return;
```

```
                    home = pwd->pw_dir;
            }
            if(home)
                    home = strdup(home);
5           return home;
    }
    static void
    gethsytoolrc(void)
    {
10          char *home;
            char buf[PATH_MAX];
            FILE *fp;
            home = GetHome();
            if (!home) {
15                  fprintf(stderr, "Cannot determine home directory\n");
                    return;
            }
            sprintf(buf, "%s/.hsytoolrc", home);
            rcfiler = rcfilew = fopen(buf, "r+");
20          if (!rcfilew)
                    rcfiler = fopen(buf, "r");
            if (!rcfiler && !rcfilew)
                    rcfiler = rcfilew = fopen(buf, "w+");
            if (!rcfiler && !rcfilew)
25                  perror(buf);
    }
    static int
    getrcline(char *c, float *rgb) {
            char buf[8192];
30          while (1) {
                    if (NULL == fgets(buf, sizeof buf - 1, rcfiler))
                            return 0;
                    if (buf[0] == '#')
                            continue;
35                  if (4 == sscanf(buf, "%c%f%f%f", c, &rgb[0], &rgb[1], &rgb[2]))
                            return 1;
            }
    }
    static putrcline(char c, float *rgb) {
40          fprintf(rcfilew, "%c %f %f %f\n", c, rgb[0], rgb[1], rgb[2]);
    } static void
```

```
       readhsytoolrc(void)
       {
               int i;
               char c;
 5             float triple[3];

gethsytoolrc();
               if (!rcfiler)
                       return;
10             while (getrcline(&c, triple)) {
                       if (c == 'b') {
                               color_background[0] = triple[0];
                               color_background[1] = triple[1];
                               color_background[2] = triple[2];
15                     } else if (c == 'c') {
                               bcopy(triple, rgbtriple, sizeof rgbtriple);
                               rgb_to_hsy(rgbtriple, hsytriple);
                       } else if (c == 'l') {
                               bcopy(triple, lightcolor, sizeof lightcolor);
20                     } else if (c == 'k') {
                               bcopy(triple, KsKdKa, sizeof KsKdKa);
                       } else if (c == 's') {
                               balls = triple[0] > .5?1:0;
                       }
25                     else if (c >= 'A' && c <= 'A'+(PALETTE_NH*PALETTE_NW)) {
                               bcopy(triple, palette_square[c-'A'].rgb, sizeof triple);
                       }
               }
               rewind(rcfiler);
30     } static void
       writehsytoolrc(void)
       {
35             int i;
               float bg[3];
               if (!rcfilew)
                       return;
               ftruncate(fileno(rcfilew), 0);
40             putrcline('c', rgbtriple);
               bg[0] = color_background[0];
               bg[1] = color_background[1];
               bg[2] = color_background[2];
```

```
            putrcline('b', bg);
            putrcline('l', lightcolor);
            putrcline('k', KsKdKa);
            bg[0] = balls;
5           putrcline('s', bg);
            for (i = 0; i < PALETTE_NH*PALETTE_NW; i++) {
                    putrcline(i+'A', palette_square[i].rgb);
            }
            rewind(rcfilew);
10   }
     /* end of .hsytoolrc stuff */
     #define NUNDO 8
     static struct undo {
15          float rgbtriple[3];
            struct palette_square palette_square[PALETTE_NH*PALETTE_NW];
            short color_background[3];
            float lightcolor[3];
            float KsKdKa[3];
20   } undolist[NUNDO];
     static int cundo;
     static void
     init_undo(void) {
            int i;
25          for (i = 0; i < NUNDO; i++)
                    save_for_undo();
     } static void
30   save_for_undo(void) {
            cundo = (cundo+1)%NUNDO;
            bcopy(rgbtriple, undolist[cundo].rgbtriple, sizeof rgbtriple);
            bcopy(&palette_square, &undolist[cundo].palette_square, sizeof palette_square);
35          bcopy(color_background, undolist[cundo].color_background, sizeof color_background);
            bcopy(lightcolor, undolist[cundo].lightcolor, sizeof lightcolor);
            bcopy(KsKdKa, undolist[cundo].KsKdKa, sizeof KsKdKa);
     }
40   static void
     undo(void) {
            cundo = cundo-1;
            if (cundo < 0)
```

```
                cundo = NUNDO-1;
           bcopy(undolist[cundo].rgbtriple, rgbtriple, sizeof rgbtriple);
           bcopy(&undolist[cundo].palette_square, &palette_square, sizeof
      palette_square);
 5         bcopy(undolist[cundo].color_background, color_background, sizeof
      color_background);
           bcopy(undolist[cundo].lightcolor, lightcolor, sizeof lightcolor);
           bcopy(undolist[cundo].KsKdKa, KsKdKa, sizeof KsKdKa);
           rgb_to_hsy(rgbtriple, hsytriple);
10         RedrawWindow(1);
      }
      static void
      setBGcolor(void) {
           rgb_to_c3s(rgbtriple, color_background);
15         RedrawWindow(1);
      } static void
      setlightcolor(void) {
20         lightcolor[0] = rgbtriple[0];
           lightcolor[1] = rgbtriple[1];
           lightcolor[2] = rgbtriple[2];
           RedrawWindow(1);
      }
25
      static void
      setKsKdKa(void) {
           KsKdKa[0] = rgbtriple[0];
           KsKdKa[1] = rgbtriple[1];
30         KsKdKa[2] = rgbtriple[2];
           RedrawWindow(1);
      } static void
35    setballsmode(void) {
           balls = !balls;
           RedrawWindow(1);
      }
```

I claim:

1. A method for manipulating color values in a computer graphics system comprising the steps of:

providing first HSY color data in a memory wherein said first HSY color data represents a first color value of a portion of an input image scene, said first HSY color data comprising a hue value, a saturation value and a luminance value, wherein said hue value, said saturation value and said luminance value are independently variable and orthogonal;

in response to user input, modifying said input image scene to create an output image scene by generating second HSY color data representing a second color value of a portion of said output image scene, said second HSY color data generated by varying at least one of said hue, saturation and luminance values in said memory;

creating an output image based on said output image scene;

displaying said output image on a display device.

2. The method of claim 1 wherein said step of providing first HSY color data further comprises the steps of:

in said memory, providing non-HSY color data representing said first color value; and transforming said non-HSY color data into said first HSY color data.

3. The method of claim 2 wherein said non-HSY color data comprises a red (R) value, a green (G) value, and a blue (B) value, wherein said step of transforming said non-HSY color data into said first HSY color data comprises the steps of:

generating said luminance value from a weighted sum of said R, G and B values;

determining a minimum value and a maximum value from said R, G and B values;

generating said saturation value from said minimum value and said luminance value;

identifying a hue region defined by which of said R, G and B values is said maximum value and which of said R, G and B values is said minimum value; and generating said hue value using a function dependent on said hue region, said luminance value and said saturation value.

4. The method of claim 3 further comprising the steps of:

assigning a zero value to said first saturation value when said luminance value is substantially zero-valued; and assigning a zero value to said first hue value when said first saturation value is substantially zero-valued.

5. The method of claim 2 wherein said transformation step is performed by a transformation routine in program code executed by said computer graphics system.

6. The method of claim 1 further comprising the step of transforming said second HSY color data into non-HSY color data.

7. The method of claim 6 wherein said non-HSY color data comprises a red (R) value, a green (G) value, and a blue (B) value, said R, G and B values forming an RGB value, and wherein said step of transforming said second HSY color data further comprises the steps of:

determining a first RGB value corresponding to a color value having said hue value of said second HSY color data, a saturation value set to unity, and a luminance value set to unity;

determining a second RGB value corresponding to a color value having said hue value of said second HSY color data, a saturation value set to zero, and a luminance value set to unity;

interpolating between said first and second RGB values to obtain a third RGB value corresponding to a color value having said hue value and said saturation value of said second HSY color data, and a luminance value set to unity; and scaling said third RGB value by said luminance value of said second HSY color data to obtain a fourth RGB value.

8. The method of claim 7 further comprising the steps of:

determining a maximum from an R value, a G value, and a B value associated with said fourth RGB value;

comparing said maximum with unity; and when said maximum exceeds unity, scaling said fourth RGB value by a reciprocal of said maximum to obtain a fifth RGB value.

9. The method of claim 7 further comprising the steps of:

determining a maximum from an R value, a G value, and a B value associated with said fourth RGB value;

comparing said maximum with unity;

when said maximum exceeds unity, performing the steps of:

normalizing said saturation value of said second HSY color data such that said maximum is equal to unity;

interpolating between said first and second RGB values to obtain a fifth RGB value corresponding to a color value having said hue value of said second HSY color data, a normalized saturation value, and a luminance value set to unity; and scaling said fifth RGB value by said luminance value of said second HSY color data to obtain a sixth RGB value.

10. The method of claim 6 wherein said step of transforming said second HSY color data is performed by a transformation routine in program code executed by said computer graphics system.

11. The method of claim 1 wherein said generating step is performed by software program code executed by said computer graphics system to display an interactive color editing image comprising a first control for said hue value, a second control for said saturation value, and a third control for said luminance value.

12. The method of claim 1 wherein said generating step is performed by software program code executed by said computer graphics system to vary said hue, saturation and luminance values in a manner transparent to a user.

13. The method of claim 12 further comprises the step of executing a rendering function.

14. The method of claim 13 wherein said first color value is associated with a texture of a rendering object.

15. The method of claim 1 further comprising the step of selecting said first color value from an image displayed on said computer graphics system.

16. The method of claim 15 further comprising the step of replacing said first color value with said second color value.

17. The method of claim 1 further comprising the step of performing a cut-and-paste operation to capture said first color value.

18. The method of claim 1 further comprising the step of performing a cut-and-paste operation to save said second color value.

19. A method for manipulating color values in a computer graphics system comprising the steps of:

in a memory in said computer graphics system, providing first non-HSY color data representing a first color value of a portion of an input image scene;

transforming said non-HSY color data into first HSY color data comprising a hue value, a saturation value and a luminance value, wherein said hue value, said saturation value and said luminance value are independently variable and orthogonal;

in response to user input, modifying said input image scene to create an output image scene by generating second HSY color data representing a second color value of a portion of said output image scene by varying at least one of said hue, saturation and luminance values in said memory;

transforming said second HSY color data into second non-HSY color data;

creating an output image based on said output image scene;

displaying said output image on a display device.

20. The method of claim 19 wherein said first non-HSY color data comprises a red (R) value, a green (G) value, and a blue (B) value, wherein said step of transforming said first non-HSY color data into said first HSY color data comprises the steps of:

generating said luminance value from a weighted sum of said R, G and B values;

determining a minimum value and a maximum value from said R, G and B values;

generating said saturation value from said minimum value and said luminance value;

identifying a hue region defined by which of said R, G and B values is said maximum value and which of said R, G and B values is said minimum value; and generating said hue value using a function dependent on said hue region, said luminance value and said saturation value.

21. The method of claim 19 further comprising the steps of:

assigning a zero value to said first saturation value when said luminance value is substantially zero-valued; and assigning a zero value to said first hue value when said first saturation value is substantially zero-valued.

22. The method of claim 21 wherein said transforming steps are performed by transformation routines in program code executed by said computer graphics system.

23. The method of claim 19 wherein said second non-HSY color data comprises a red (R) value, a green (G) value, and a blue (B) value, said R, G and B values forming an RGB value, and wherein said step of transforming said second HSY color data further comprises the steps of:

determining a first RGB value corresponding to a color value having said hue value of said second HSY color data, a saturation value set to unity, and a luminance value set to unity;

determining a second RGB value corresponding to a color value having said hue value of said second HSY color data, a saturation value set to zero, and a luminance value set to unity;

interpolating between said first and second RGB values to obtain a third RGB value corresponding to a color value having said hue value and said saturation value of said second HSY color data, and a luminance value set to unity; and scaling said third RGB value by said luminance value of said second HSY color data to obtain a fourth RGB value.

24. The method of claim 23 further comprising the steps of:

determining a maximum from an R value, a G value, and a B value associated with said fourth RGB value;

comparing said maximum with unity; and when said maximum exceeds unity, scaling said fourth RGB value by a reciprocal of said maximum to obtain a fifth RGB value.

25. The method of claim 23 further comprising the steps of:

determining a maximum from an R value, a G value, and a B value associated with said fourth RGB value;

comparing said maximum with unity;

when said maximum exceeds unity, performing the steps of:

normalizing said saturation value of said second HSY color data such that said maximum is equal to unity;

interpolating between said first and second RGB values to obtain a fifth RGB value corresponding to a color value having said hue value of said second HSY color data, a normalized saturation value, and a luminance value set to unity; and scaling said fifth RGB value by said luminance value of said second HSY color data to obtain a sixth RGB value.

26. The method of claim 19 wherein said generating step is performed by software program code executed by said computer graphics system to display an interactive color editing image comprising a first control for said hue value, a second control for said saturation value, and a third control for said luminance value.

27. The method of claim 19 wherein said generating step is performed by software program code executed by said computer graphics system to vary said hue, saturation and luminance values in a manner transparent to a user.

28. The method of claim 27 further comprises the step of executing a rendering function.

29. The method of claim 28 wherein said first color value is associated with a texture of a rendering object.

30. The method of claim 19 further comprising the step of selecting said first color value from an image displayed on said computer graphics system.

31. The method of claim 30 further comprising the step of replacing said first color value with said second color value.

32. The method of claim 19 further comprising the step of performing a cut-and-paste operation to capture said first color value.

33. The method of claim 19 further comprising the step of performing a cut-and-paste operation to save said second color value.

34. A computer program product comprising:

a computer usable medium having computer readable program code means embodied in said medium for causing a computer to manipulate a color value, said computer readable program code means comprising:

computer readable program code means for causing a computer to read a first color value of a portion of an input image scene in the form of first HSY color data having a hue value, a saturation value and a luminance value, wherein said hue value, said saturation value and said luminance value are independently variable and orthogonal; and computer readable program code means for causing said computer to modify said input image scene to create an output image scene in response to user input by generating a second color value of a portion of said output image scene by modifying at least one of said hue, saturation and luminance values to form second HSY color data;

computer readable program code means for causing said computer to create an output image based on said output image scene;

computer readable program code means for causing said computer to display said output image on a display device.

35. The computer program product of claim 34 wherein said computer readable program code means for causing said computer to generate said second color value comprises:

computer readable program code means for displaying a first user interactive control for modifying said hue value, a second user interactive control for modifying said saturation value, and a third user interactive control for modifying said luminance value; and computer readable program code means for responding to user input on said first control, said second control and said third control to generate said second color value.

36. The computer program product of claim 34 wherein said computer usable medium further comprises computer readable program code means for causing said computer to respond to user input to select said first color value from an image displayed by a display unit.

37. The computer program product of claim 34 wherein said computer usable medium further comprises computer readable program code means for causing said computer to respond to user input to apply said second color value to an image displayed by a display unit.

38. The computer program product of claim 34 wherein said computer usable medium further comprises computer readable program code means for causing said computer to transform said second HSY color data into non-HSY color data.

39. The computer program product of claim 38 wherein said computer readable program code means for causing said computer to transform said second HSY color data into said non-HSY color data comprises:

computer readable program code means for causing said computer to determine first non-HSY color data corresponding to a color value having said saturation value of said second HSY color data, a unity saturation value, and a unity luminance value;

computer readable program code means for causing said computer to determine second non-HSY color data corresponding to a color value having said hue value of said second HSY color data, a saturation value of zero, and a unity luminance value;

computer readable program code means for causing said computer to determine third non-HSY color data by interpolating between said first non-HSY color data and said second non-HSY color data; and computer readable program code means for causing said computer to scale said third non-HSY color data by said luminance value of said second HSY color data to obtain fourth non-HSY color data.

40. The computer program product of claim 39 wherein said non-HSY color data comprises a plurality of component values, and wherein said computer readable program code means for causing said computer to transform said second HSY color data into said non-HSY color data further comprises:

computer readable program code means for causing said computer to determine a maximum value from a plurality of component values associated with said fourth non-HSY color data; and computer readable program code means for causing said computer to scale said fourth non-HSY color data by the reciprocal of said maximum value if said maximum value exceeds unity.

41. The computer program product of claim 39 wherein said computer readable program code means for causing said computer to transform said second HSY color data into said non-HSY color data further comprises:

computer readable program code means for causing said computer to determine a maximum value from a plurality of component values associated with said fourth non-HSY color data; and computer readable program code means for causing, if said maximum value exceeds unity, said computer to normalize said saturation value of said second HSY color data and to determine fifth non-HSY color data based on a normalized saturation value and said hue and luminance values from said second HSY color data.

42. The computer program product of claim 34 wherein said computer usable medium further comprises computer readable program code means for causing said computer to transform non-HSY color data representing said first color value into said first HSY color data.

43. The computer program product of claim 42 wherein said non-HSY color data has a plurality of component values, and wherein said computer readable program code means for causing said computer to transform said non-HSY color data comprises:

computer readable program code means for causing said computer to determine said luminance value from a weighted sum of said plurality of component values;

computer readable program code means for causing said computer to determine a minimum and a maximum from said plurality of component values;

computer readable program code means for causing said computer to determine said saturation value from said minimum and said luminance value;

computer readable program code means for causing said computer to determine a hue region based on which two component values in said plurality of component values are said maximum and said minimum; and computer readable program code means for causing said computer to determine said hue value based on said saturation value, said luminance value and said hue region.

44. The computer program product of claim 43 wherein said computer readable program code means for causing said computer to transform said non-HSY color data further comprises:

computer readable program code means for causing said computer to assign a value of zero to said saturation value if said luminance value is substantially zero; and computer readable program code means for causing said computer to assign a value of zero to said hue value if said saturation value is substantially zero.

45. The computer program product of claim 38 wherein said non-HSY color data comprises RGB color data having a red component value, a green component value, and a blue component value.

46. A method for manipulating color values in a computer graphics system comprising the steps of:

in a memory, providing first non-HSY color data representing a first color value of a portion of an input image scene, said first non-HSY color data comprising a red (R) value, a green (G) value, and a blue (B) value;

transforming said first non-HSY color data into first HSY color data, said first HSY color data comprising a hue value, a saturation value and a luminance value, wherein said hue value, said saturation value and said luminance value are independently variable;

in response to user input modifying said input image scene to create an output image scene by generating second HSY color data representing a second color value of a portion of said output image scene, said second HSY color data generated by varying at least one of said hue, saturation and luminance values in said memory;

creating an output image based on said output image scene;

displaying said output image on a display device;

wherein said step of transforming said first non-HSY color data into said first HSY color data comprises the steps of:

generating said luminance value from a weighted sum of said R, G and B values;

determining a minimum value and a maximum value from said R, G and B values;

generating said saturation value from said minimum value and said luminance value;

identifying a hue region defined by which of said R, G and B values is said maximum value and which of said R, G and B values is said minimum value; and generating said hue value using a function dependent on said hue region, said luminance value and said saturation value.

47. The method of claim 46 further comprising the steps of:

assigning a zero value to said saturation value when said luminance value is substantially zero-valued; and assigning a zero value to said hue value when said saturation value is substantially zero-valued.

48. The method of claim 46 wherein said transformation step is performed by a transformation routine in program code executed by said computer graphics system.

49. The method of claim 46 further comprising the step of transforming said second HSY color data into second non-HSY color data.

50. The method of claim 49 wherein said step of transforming said second HSY color data comprises the steps of:

determining a first RGB value corresponding to a color value having said hue value of said second HSY color data, a saturation value set to unity, and a luminance value set to unity;

determining a second RGB value corresponding to a color value having said hue value of said second HSY color data, a saturation value set to zero, and a luminance value set to unity;

interpolating between said first and second RGB values to obtain a third RGB value corresponding to a color value having said hue value and said saturation value of said second HSY color data, and a luminance value set to unity; and scaling said third RGB value by said luminance value of said second HSY color data to obtain a fourth RGB value.

51. The method of claim 50 wherein said step of transforming said second HSY color data further comprises the steps of:

determining a maximum from an R value, a G value, and a B value associated with said fourth RGB value;

comparing said maximum with unity; and when said maximum exceeds unity, scaling said fourth RGB value by a reciprocal of said maximum to obtain a fifth RGB value.

52. The method of claim 50 wherein said step of transforming said second HSY color data further comprises the steps of:

determining a maximum from an R value, a G value, and a B value associated with said fourth RGB value;

comparing said maximum with unity;

when said maximum exceeds unity, performing the steps of:

normalizing said saturation value of said second HSY color data such that said maximum is equal to unity;

interpolating between said first and second RGB values to obtain a fifth RGB value corresponding to a color value having said hue value of said second HSY color data, a normalized saturation value, and a luminance value set to unity; and scaling said fifth RGB value by said luminance value of said second HSY color data to obtain a sixth RGB value.

53. The method of claim 49 wherein said step of transforming said second HSY color data is performed by a transformation routine in program code executed by said computer graphics system.

54. The method of claim 46 wherein said generating step is performed by software program code executed by said computer graphics system to display an interactive color editing image comprising a first control for said hue value, a second control for said saturation value, and a third control for said luminance value.

55. The method of claim 46 wherein said generating step is performed by software program code executed by said computer graphics system to vary said hue, saturation and luminance values in a manner transparent to a user.

56. The method of claim 55 further comprises the step of executing a rendering function.

57. The method of claim 56 wherein said first color value is associated with a texture of a rendering object.

58. The method of claim 46 further comprising the step of selecting said first color value from an image displayed on said computer graphics system.

59. The method of claim 58 further comprising the step of replacing said first color value with said second color value.

60. The method of claim 46 further comprising the step of performing a cut-and-paste operation to capture said first color value.

61. The method of claim 46 further comprising the step of performing a cut-and-paste operation to save said second color value.

62. A method for manipulating color values in a computer graphics system comprising the steps of:

providing first HSY color data in a memory wherein said first HSY color data represents a first color value of a portion of an input image scene, said first HSY color data comprising a hue value, a saturation value and a luminance value, wherein said hue value, said saturation value and said luminance value are independently variable;

in response to user input modifying said input image scene to create an output image scene by generating second HSY color data representing a second color value of a portion of said output image scene, said second HSY color data generated by varying at least one of said hue, saturation and luminance values in said memory;

transforming said second HSY color data into first non-HSY color data, wherein said first non-HSY color data comprises a red (R) value, a green (G) value, and a blue (B) value, said R, G and B values forming an RGB value;

creating an output image based on said output image scene;

displaying said output image on a display device;

and wherein said step of transforming said second HSY color data comprises the steps of:

determining a first RGB value corresponding to a color value having said hue value of said second HSY color data, a saturation value set to unity, and a luminance value set to unity;

determining a second RGB value corresponding to a color value having said hue value of said second HSY color data, a saturation value set to zero, and a luminance value set to unity;

interpolating between said first and second RGB values to obtain a third RGB value corresponding to a color value having said hue value and said saturation value of said second HSY color data, and a luminance value set to unity; and scaling said third RGB value by said luminance value of said second HSY color data to obtain a fourth RGB value.

63. The method of claim 62 wherein said step of providing first HSY color data further comprises the steps of:

in said memory, providing second non-HSY color data representing said first color value; and transforming said second non-HSY color data into said first HSY color data.

64. The method of claim 63 wherein said step of transforming said second non-HSY color data into said first HSY color data comprises the steps of:

generating said luminance value from a weighted sum of R, G and B values of said second non-HSY color data;

determining a minimum value and a maximum value from said R, G and B values of said second non-HSY color data;

generating said saturation value from said minimum value and said luminance value;

identifying a hue region defined by which of said R, G and B values of said second non-HSY color data is said maximum value and which of said R, G and B values of said second non-HSY color data is said minimum value;

generating said hue value using a function dependent on said hue region, said luminance value and said saturation value;

assigning a zero value to said saturation value when said luminance value is substantially zero-valued; and assigning a zero value to said hue value when said saturation value is substantially zero-valued.

65. The method of claim 63 wherein said step of transforming said second non-HSY color data is performed by a transformation routine in program code executed by said computer graphics system.

66. The method of claim 62 wherein said step of transforming said second non-HSY color data further comprises the steps of:

determining a maximum from an R value, a G value, and a B value associated with said fourth RGB value;

comparing said maximum with unity; and when said maximum exceeds unity, scaling said fourth RGB value by a reciprocal of said maximum to obtain a fifth RGB value.

67. The method of claim 62 wherein said step of transforming said second non-HSY color data further comprises the steps of:

determining a maximum from an R value, a G value, and a B value associated with said fourth RGB value;

comparing said maximum with unity;

when said maximum exceeds unity, performing the steps of:

normalizing said saturation value of said second HSY color data such that said maximum is equal to unity;

interpolating between said first and second RGB values to obtain a fifth RGB value corresponding to a color value having said hue value of said second HSY color data, a normalized saturation value, and a luminance value set to unity; and scaling said fifth RGB value by said luminance value of said second HSY color data to obtain a sixth RGB value.

68. The method of claim 62 wherein said step of transforming said second HSY color data is performed by a transformation routine in program code executed by said computer graphics system.

69. The method of claim 62 wherein said generating step is performed by software program code executed by said computer graphics system to display an interactive color editing image comprising a first control for said hue value, a second control for said saturation value, and a third control for said luminance value.

70. The method of claim 62 wherein said generating step is performed by software program code executed by said computer graphics system to vary said hue, saturation and luminance values in a manner transparent to a user.

71. The method of claim 70 further comprises the step of executing a rendering function.

72. The method of claim 71 wherein said first color value is associated with a texture of a rendering object.

73. The method of claim 62 further comprising the step of selecting said first color value from an image displayed on said computer graphics system.

74. The method of claim 73 further comprising the step of replacing said first color value with said second color value.

75. The method of claim 62 further comprising the step of performing a cut-and-paste operation to capture said first color value.

76. The method of claim 62 further comprising the step of performing a cut-and-paste operation to save said second color value.

77. A method for manipulating color values in a computer graphics system comprising the steps of:

in a memory in said computer graphics system, providing first non-HSY color data representing a first color value of a portion of an input image scene, wherein said first non-HSY color data comprises a red (R) value, a green (G) value, and a blue (B) value;

transforming said first non-HSY color data into first HSY color data comprising a hue value, a saturation value and a luminance value, wherein said hue value, said saturation value and said luminance value are independently variable;

in response to user input, modifying said input image scene to create an output image scene by generating second HSY color data representing a second color value of a portion of said output image scene by varying at least one of said hue, saturation and luminance values in said memory;

transforming said second HSY color data into second non-HSY color data;

creating an output image based on said output image scene;

displaying said output image on a display device;
wherein said step of transforming said first non-HSY color data into said first HSY color data comprises the steps of:
  generating said luminance value from a weighted sum of said R, G and B values;
  determining a minimum value and a maximum value from said R, G and B values;
  generating said saturation value from said minimum value and said luminance value;
  identifying a hue region defined by which of said R, G and B values is said maximum value and which of said R, G and B values is said minimum value; and
  generating said hue value using a function dependent on said hue region, said luminance value and said saturation value.

78. The method of claim 77 further comprising the steps of:
  assigning a zero value to said first saturation value when said luminance value is substantially zero-valued; and
  assigning a zero value to said first hue value when said first saturation value is substantially zero-valued.

79. The method of claim 77 wherein said transforming steps are performed by transformation routines in program code executed by said computer graphics system.

80. The method of claim 77 wherein said step of transforming said second HSY color data comprises the steps of:
  determining a first RGB value corresponding to a color value having said hue value of said second HSY color data, a saturation value set to unity, and a luminance value set to unity;
  determining a second RGB value corresponding to a color value having said hue value of said second HSY color data, a saturation value set to zero, and a luminance value set to unity;
  interpolating between said first and second RGB values to obtain a third RGB value corresponding to a color value having said hue value and said saturation value of said second HSY color data, and a luminance value set to unity; and
  scaling said third RGB value by said luminance value of said second HSY color data to obtain a fourth RGB value.

81. The method of claim 80 wherein said step of transforming said second HSY color data further comprises the steps of:
  determining a maximum from an R value, a G value, and a B value associated with said fourth RGB value;
  comparing said maximum with unity; and
  when said maximum exceeds unity, scaling said fourth RGB value by a reciprocal of said maximum to obtain a fifth RGB value.

82. The method of claim 80 wherein said step of transforming said second HSY color data further comprises the steps of:
  determining a maximum from an R value, a G value, and a B value associated with said fourth RGB value;
  comparing said maximum with unity;
  when said maximum exceeds unity, performing the steps of:
    normalizing said saturation value of said second HSY color data such that said maximum is equal to unity;
    interpolating between said first and second RGB values to obtain a fifth RGB value corresponding to a color value having said hue value of said second HSY color data, a normalized saturation value, and a luminance value set to unity; and
    scaling said fifth RGB value by said luminance value of said second HSY color data to obtain a sixth RGB value.

83. The method of claim 77 wherein said generating step is performed by software program code executed by said computer graphics system to display an interactive color editing image comprising a first control for said hue value, a second control for said saturation value, and a third control for said luminance value.

84. The method of claim 77 wherein said generating step is performed by software program code executed by said computer graphics system to vary said hue, saturation and luminance values in a manner transparent to a user.

85. The method of claim 84 further comprising the step of executing a rendering function.

86. The method of claim 85 wherein said first color value is associated with a texture of a rendering object.

87. The method of claim 77 further comprising the step of selecting said first color value from an image displayed on said computer graphics system.

88. The method of claim 87 further comprising the step of replacing said first color value with said second color value.

89. The method of claim 77 further comprising the step of performing a cut-and-paste operation to capture said first color value.

90. The method of claim 77 further comprising the step of performing a cut-and-paste operation to save said second color value.

91. A method for manipulating color values in a computer graphics system comprising the steps of:
  in a memory in said computer graphics system, providing first non-HSY color data representing a first color value of a portion of an input image scene;
  transforming said first non-HSY color data into first HSY color data comprising a hue value, a saturation value and a luminance value, wherein said hue value, said saturation value and said luminance value are independently variable;
  in response to user input, modifying said input image scene to create an output image scene by generating second HSY color data representing a second color value of a portion of said output image scene by varying at least one of said hue, saturation and luminance values in said memory;
  transforming said second HSY color data into second non-HSY color data, said second non-HSY color data comprising a red (R) value, a green (G) value, and a blue (B) value, said R, G and B values forming an RGB value;
  creating an output image based on said output image scene;
  displaying said output image on a display device;
  wherein said step of transforming said second HSY color data comprises the steps of:
    determining a first RGB value corresponding to a color value having said hue value of said second HSY color data, a saturation value set to unity, and a luminance value set to unity;
    determining a second RGB value corresponding to a color value having said hue value of said second HSY color data, a saturation value set to zero, and a luminance value set to unity;
    interpolating between said first and second RGB values to obtain a third RGB value corresponding to a color value having said hue value and said saturation value of said second HSY color data, and a luminance value set to unity; and scaling said third RGB value by said luminance value of said second HSY color data to obtain a fourth RGB value.

92. The method of claim 91 wherein said first non-HSY color data comprises a red (R) value, a green (G) value, and a blue (B) value, wherein said step of transforming said first non-HSY color data into said first HSY color data comprises the steps of:

generating said luminance value from a weighted sum of said R, G and B values of said first non-HSY color data;

determining a minimum value and a maximum value from said R, G and B values of said first non-HSY color data;

generating said saturation value from said minimum value and said luminance value;

identifying a hue region defined by which of said R, G and B values of said first non-HSY color data is said maximum value and which of said R, G and B values of said first non-HSY color data is said minimum value;

generating said hue value using a function dependent on said hue region, said luminance value and said saturation value;

assigning a zero value to said saturation value when said luminance value is substantially zero-valued; and assigning a zero value to said hue value when said saturation value is substantially zero-valued.

93. The method of claim 91 wherein said transforming steps are performed by transformation routines in program code executed by said computer graphics system.

94. The method of claim 91 further comprising the steps of:

determining a maximum from an R value, a G value, and a B value associated with said fourth RGB value;

comparing said maximum with unity; and when said maximum exceeds unity, scaling said fourth RGB value by a reciprocal of said maximum to obtain a fifth RGB value.

95. The method of claim 91 further comprising the steps of:

determining a maximum from an R value, a G value, and a B value associated with said fourth RGB value;

comparing said maximum with unity;

when said maximum exceeds unity, performing the steps of:

normalizing said saturation value of said second HSY color data such that said maximum is equal to unity;

interpolating between said first and second RGB values to obtain a fifth RGB value corresponding to a color value having said hue value of said second HSY color data, a normalized saturation value, and a luminance value set to unity; and scaling said fifth RGB value by said luminance value of said second HSY color data to obtain a sixth RGB value.

96. The method of claim 91 wherein said generating step is performed by software program code executed by said computer graphics system to display an interactive color editing image comprising a first control for said hue value, a second control for said saturation value, and a third control for said luminance value.

97. The method of claim 91 wherein said generating step is performed by software program code executed by said computer graphics system to vary said hue, saturation and luminance values in a manner transparent to a user.

98. The method of claim 97 further comprising the step of executing a rendering function.

99. The method of claim 98 wherein said first color value is associated with a texture of a rendering object.

100. The method of claim 91 further comprising the step of selecting said first color value from an image displayed on said computer graphics system.

101. The method of claim 100 further comprising the step of replacing said first color value with said second color value.

102. The method of claim 91 further comprising the step of performing a cut-and-paste operation to capture said first color value.

103. The method of claim 91 further comprising the step of performing a cut-and-paste operation to save said second color value.

104. A computer program product comprising:

a computer usable medium having computer readable program code means embodied in said medium for causing a computer to manipulate a color value, said computer readable program code means comprising:

computer readable program code means for causing a computer to read a first color value of a portion of an input image scene in the form of first HSY color data having a hue value, a saturation value and a luminance value, wherein said hue value, said saturation value and said luminance value are independently variable;

computer readable program code means for causing said computer to modify said input image scene in response to user input to create an output image scene by generating a second color value of a portion of said output image scene by modifying at least one of said hue, saturation and luminance values to form second HSY color data;

computer readable program code means for causing said computer to transform said second HSY color data into non-HSY color data, comprising:

computer readable program code means for causing said computer to determine first non-HSY color data corresponding to a color value having said saturation value of said second HSY color data, a unity saturation value, and a unity luminance value;

computer readable program code means for causing said computer to determine second non-HSY color data corresponding to a color value having said hue value of said second HSY color data, a saturation value of zero, and a unity luminance value;

computer readable program code means for causing said computer to determine third non-HSY color data by interpolating between said first non-HSY color data and said second non-HSY color data; and computer readable program code means for causing said computer to scale said third non-HSY color data by said luminance value of said second HSY color data to obtain fourth non-HSY color data;

computer readable program code means for causing said computer to create an output image based on said output image scene;

computer readable program code means for causing said computer to display said output image on a display device.

105. The computer program product of claim 104 wherein said computer readable program code means for causing said computer to generate said second color value comprises:

computer readable program code means for displaying a first user interactive control for modifying said hue value, a second user interactive control for modifying said saturation value, and a third user interactive control for modifying said luminance value; and computer readable program code means for responding to user input on said first control, said second control and said third control to generate said second color value.

106. The computer program product of claim 104 wherein said computer usable medium further comprises computer readable program code means for causing said computer to respond to user input to select said first color value from an image displayed by a display unit.

107. The computer program product of claim 104 wherein said computer usable medium further comprises computer readable program code means for causing said computer to respond to user input to apply said second color value to an image displayed by a display unit.

108. The computer program product of claim 104 wherein said non-HSY color data comprises a plurality of component values, and wherein said computer readable program code means for causing said computer to transform said second HSY color data into said non-HSY color data further comprises:

computer readable program code means for causing said computer to determine a maximum value from a plurality of component values associated with said fourth non-HSY color data; and computer readable program code means for causing said computer to scale said fourth non-HSY color data by the reciprocal of said maximum value if said maximum value exceeds unity.

109. The computer program product of claim 104 wherein said computer readable program code means for causing said computer to transform said second HSY color data into said non-HSY color data further comprises:

computer readable program code means for causing said computer to determine a maximum value from a plurality of component values associated with said fourth non-HSY color data; and computer readable program code means for causing, if said maximum value exceeds unity, said computer to normalize said saturation value of said second HSY color data and to determine fifth non-HSY color data based on a normalized saturation value and said hue and luminance values from said second HSY color data.

110. The computer program product of claim 104 wherein said computer usable medium further comprises computer readable program code means for causing said computer to transform non-HSY color data representing said first color value into said first HSY color data.

111. The computer program product of claim 110 wherein said non-HSY color data representing said first color value has a plurality of component values, and wherein said computer readable program code means for causing said computer to transform said non-HSY color data representing said first color value comprises:

computer readable program code means for causing said computer to determine said luminance value from a weighted sum of said plurality of component values;

computer readable program code means for causing said computer to determine a minimum and a maximum from said plurality of component values;

computer readable program code means for causing said computer to determine said saturation value from said minimum and said luminance value;

computer readable program code means for causing said computer to determine a hue region based on which two component values in said plurality of component values are said maximum and said minimum; and computer readable program code means for causing said computer to determine said hue value based on said saturation value, said luminance value and said hue region.

112. The computer program product of claim 111 wherein said computer readable program code means for causing said computer to transform said non-HSY color data representing said first color value further comprises:

computer readable program code means for causing said computer to assign a value of zero to said saturation value if said luminance value is substantially zero; and computer readable program code means for causing said computer to assign a value of zero to said hue value if said saturation value is substantially zero.

113. The computer program product of claim 104 wherein said non-HSY color data comprises RGB color data having a red component value, a green component value, and a blue component value.

114. A computer program product comprising:

a computer usable medium having computer readable program code means embodied in said medium for causing a computer to manipulate a color value, said computer readable program code means comprising:

computer readable program code means for causing a computer to transform non-HSY color data representing a first color value of a portion of an input image scene into first HSY color data having a hue value, a saturation value and a luminance value, wherein said hue value, said saturation value and said luminance value are independently variable;

computer readable program code means for causing said computer to modify said input image scene to create an output image scene in response to user input by generating a second color value of a portion of said output image scene by modifying at least one of said hue, saturation and luminance values to form second HSY color data;

computer readable program code means for causing said computer to create an output image based on said output image scene;

computer readable program code means for causing said computer to display said output image on a display device;

wherein said non-HSY color data has a plurality of component values, and wherein said computer readable program code means for causing said computer to transform said non-HSY color data comprises:

computer readable program code means for causing said computer to determine said luminance value from a weighted sum of said plurality of component values;

computer readable program code means for causing said computer to determine a minimum and a maximum from said plurality of component values;

computer readable program code means for causing said computer to determine said saturation value from said minimum and said luminance value;

computer readable program code means for causing said computer to determine a hue region based on which two component values in said plurality of component values are said maximum and said minimum; and computer readable program code means for causing said computer to determine said hue value based on said saturation value, said luminance value and said hue region.

115. The computer program product of claim 114 wherein said computer readable program code means for causing said computer to generate said second color value comprises:
   computer readable program code means for displaying a first user interactive control for modifying said hue value, a second user interactive control for modifying said saturation value, and a third user interactive control for modifying said luminance value; and
   computer readable program code means for responding to user input on said first control, said second control and said third control to generate said second color value.

116. The computer program product of claim 114 wherein said computer usable medium further comprises computer readable program code means for causing said computer to respond to user input to select said first color value from an image displayed by a display unit.

117. The computer program product of claim 114 wherein said computer usable medium further comprises computer readable program code means for causing said computer to respond to user input to apply said second color value to an image displayed by a display unit.

118. The computer program product of claim 114 wherein said computer usable medium further comprises computer readable program code means for causing said computer to transform said second HSY color data into non-HSY color data representing said second color value, comprising:
   computer readable program code means for causing said computer to determine first non-HSY color data corresponding to a color value having said saturation value of said second HSY color data, a unity saturation value, and a unity luminance value;
   computer readable program code means for causing said computer to determine second non-HSY color data corresponding to a color value having said hue value of said second HSY color data, a saturation value of zero, and a unity luminance value;
   computer readable program code means for causing said computer to determine third non-HSY color data by interpolating between said first non-HSY color data and said second non-HSY color data; and
   computer readable program code means for causing said computer to scale said third non-HSY color data by said luminance value of said second HSY color data to obtain fourth non-HSY color data.

119. The computer program product of claim 118 wherein said computer readable program code means for causing said computer to transform said second HSY color data into said non-HSY color data comprises:
   computer readable program code means for causing said computer to determine a maximum value from a plurality of component values associated with said fourth non-HSY color data; and
   computer readable program code means for causing said computer to scale said fourth non-HSY color data by the reciprocal of said maximum value associated with said fourth non-HSY color data if said maximum value associated with said fourth non-HSY color data exceeds unity.

120. The computer program product of claim 118 wherein said computer readable program code means for causing said computer to transform said second HSY color data into said non-HSY color data comprises:
   computer readable program code means for causing said computer to determine a maximum value from a plurality of component values associated with said fourth non-HSY color data; and
   computer readable program code means for causing, if said maximum value associated with said fourth non-HSY color data exceeds unity, said computer to normalize said saturation value of said second HSY color data and to determine fifth non-HSY color data based on a normalized saturation value and said hue and luminance values from said second HSY color data.

121. The computer program product of claim 118 wherein said non-HSY color data comprises RGB color data having a red component value, a green component value, and a blue component value.

122. The computer program product of claim 114 wherein said computer readable program code means for causing said computer to transform said non-HSY color data further comprises:
   computer readable program code means for causing said computer to assign a value of zero to said saturation value if said luminance value is substantially zero; and
   computer readable program code means for causing said computer to assign a value of zero to said hue value if said saturation value is substantially zero.

123. A computer program product comprising:
   a computer usable medium having computer readable program code means embodied in said medium for causing a computer to manipulate a color value, said computer readable program code means comprising:
   computer readable program code means for causing a computer to read a first color value in the form of first HSY color data having a hue value, a saturation value and a luminance value, wherein said hue value, said saturation value and said luminance value are independently variable and orthogonal;
   computer readable program code means for causing said computer to generate a second color value for display on a display unit by modifying at least one of said hue, saturation and luminance values to form second HSY color data,
   computer readable program code means for causing said computer to respond to user input to apply said second color value to an image displayed by a display unit.

124. A computer program product comprising:
   a computer usable medium having computer readable program code means embodied in said medium for causing a computer to manipulate a color value, said computer readable program code means comprising:
   computer readable program code means for causing a computer to read a first color value in the form of first HSY color data having a hue value, a saturation value and a luminance value, wherein said hue value, said saturation value and said luminance value are independently variable;
   computer readable program code means for causing said computer to generate a second color value by modifying at least one of said hue, saturation and luminance values to form second HSY color data;
   computer readable program code means for causing said computer to transform said second HSY color data into non-HSY color data for display on a display unit, comprising:
      computer readable program code means for causing said computer to determine first non-HSY color data corresponding to a color value having said saturation value of said second HSY color data, a unity saturation value, and a unity luminance value;

computer readable program code means for causing said computer to determine second non-HSY color data corresponding to a color value having said hue value of said second HSY color data, a saturation value of zero, and a unity luminance value;

computer readable program code means for causing said computer to determine third non-HSY color data by interpolating between said first non-HSY color data and said second non-HSY color data; and computer readable program code means for causing said computer to scale said third non-HSY color data by said luminance value of said second HSY color data to obtain fourth non-HSY color data; and computer readable program code means for causing said computer to respond to user input to apply said second color value to an image displayed by a display unit.

125. A computer program product comprising:

a computer usable medium having computer readable program code means embodied in said medium for causing a computer to manipulate a color value, said computer readable program code means comprising:

computer readable program code means for causing a computer to transform non-HSY color data representing a first color value into first HSY color data having a hue value, a saturation value and a luminance value, wherein said hue value, said saturation value and said luminance value are independently variable;

computer readable program code means for causing said computer to generate a second color value for display on a display unit by modifying at least one of said hue, saturation and luminance values to form second HSY color data;

wherein said non-HSY color data has a plurality of component values, and wherein said computer readable program code means for causing said computer to transform said non-HSY color data comprises:

computer readable program code means for causing said computer to determine said luminance value from a weighted sum of said plurality of component values;

computer readable program code means for causing said computer to determine a minimum and a maximum from said plurality of component values;

computer readable program code means for causing said computer to determine said saturation value from said minimum and said luminance value;

computer readable program code means for causing said computer to determine a hue region based on which two component values in said plurality of component values are said maximum and said minimum;

computer readable program code means for causing said computer to determine said hue value based on said saturation value, said luminance value and said hue region; and computer readable program code means for causing said computer to respond to user input to apply said second color value to an image displayed by a display unit.

* * * * *